(12) United States Patent
Hao et al.

(10) Patent No.: US 12,530,328 B2
(45) Date of Patent: Jan. 20, 2026

(54) DATA GOVERNANCE METHOD AND APPARATUS, AND STORAGE MEDIUM

(71) Applicant: Huawei Cloud Computing Technologies Co., Ltd., Guizhou (CN)

(72) Inventors: Shiyuan Hao, Hangzhou (CN); Ziheng Wei, Gui'an (CN); Jiang Long, Hangzhou (CN); Hong Lu, Shenzhen (CN); Zhenfeng Ji, Xi'an (CN)

(73) Assignee: HUAWEI CLOUD COMPUTING TECHNOLOGIES CO., LTD., Guizhou (CN)

( * ) Notice: Subject to any disclaimer, the term of this patent is extended or adjusted under 35 U.S.C. 154(b) by 0 days.

(21) Appl. No.: 18/673,569

(22) Filed: May 24, 2024

(65) Prior Publication Data
US 2024/0311353 A1    Sep. 19, 2024

Related U.S. Application Data

(63) Continuation of application No. PCT/CN2022/091791, filed on May 9, 2022.

(30) Foreign Application Priority Data

Nov. 26, 2021 (CN) .......................... 202111422755.7
Feb. 25, 2022 (CN) .......................... 202210179899.2

(51) Int. Cl.
*G06F 16/215* (2019.01)
*G06F 16/23* (2019.01)
(Continued)

(52) U.S. Cl.
CPC ........ *G06F 16/215* (2019.01); *G06F 16/2365* (2019.01); *G06F 16/258* (2019.01); *G06F 16/84* (2019.01)

(58) Field of Classification Search
CPC ...... G06F 16/215; G06F 16/84; G06F 16/258; G06F 16/2365
See application file for complete search history.

(56) References Cited

U.S. PATENT DOCUMENTS 7,653,633 B2 * 1/2010 Villella ............... G06F 11/3476
                                                      707/648
9,705,817 B2 * 7/2017 Lui ..................... H04L 41/0886
(Continued)

FOREIGN PATENT DOCUMENTS

CN          105138609 A        12/2015
CN          109408502 A         3/2019
(Continued)

OTHER PUBLICATIONS

Anonymous: "Global Data Quality Tools Market Report 2020-2027—Product Data Segment Corners a 16.1% Share in 2020," GlobeNewswire, Jul. 24, 2020. 5 pages.

*Primary Examiner* — Mark E Hershley
(74) *Attorney, Agent, or Firm* — Conley Rose, P.C.

(57) ABSTRACT

A data governance method includes: reading a storage file from a database server, where the storage file is used to store data that belongs to at least one service; obtaining at least one data pattern of a first data set, where the first data set includes data that belongs to a same service and that is stored in the storage file, and the at least one data pattern indicates a structure of each piece of data included in the first data set; obtaining, based on the at least one data pattern, at least one data feature of the first data set; and obtaining a first data standard based on the at least one data feature.

20 Claims, 10 Drawing Sheets

(51) Int. Cl.
*G06F 16/25* (2019.01)
*G06F 16/84* (2019.01)

(56) References Cited

U.S. PATENT DOCUMENTS

| | | | | |
|---|---|---|---|---|
| 9,881,045 | B2* | 1/2018 | Namkoong | G06F 16/2365 |
| 9,992,228 | B2* | 6/2018 | Ray | H04L 63/1408 |
| 10,318,583 | B2* | 6/2019 | Feinberg | G06F 16/9024 |
| 10,489,462 | B1* | 11/2019 | Rogynskyy | G06Q 10/1091 |
| 10,958,457 | B1* | 3/2021 | Davis | G06Q 10/1093 |
| 11,810,001 | B1* | 11/2023 | Tang | G06N 5/022 |
| 11,853,975 | B1* | 12/2023 | Leblang | G10L 15/22 |
| 12,007,963 | B1* | 6/2024 | Rajagopalan | G06F 16/252 |
| 12,231,510 | B2* | 2/2025 | Rogynskyy | H04L 43/062 |
| 2007/0124146 | A1* | 5/2007 | Lunteren | H04L 63/145 |
| | | | | 704/255 |
| 2008/0177719 | A1* | 7/2008 | Dettinger | G06F 16/2457 |
| 2011/0167030 | A1* | 7/2011 | Bremler-Barr | G06N 5/01 |
| | | | | 706/48 |
| 2011/0307472 | A1* | 12/2011 | Slezak | G06F 16/211 |
| | | | | 707/719 |
| 2012/0197887 | A1* | 8/2012 | Anderson | G06F 16/2228 |
| | | | | 707/736 |
| 2013/0091266 | A1* | 4/2013 | Bhave | H04L 43/14 |
| | | | | 709/224 |
| 2013/0124525 | A1* | 5/2013 | Anderson | G06F 16/278 |
| | | | | 707/737 |
| 2014/0344391 | A1* | 11/2014 | Varney | H04L 65/612 |
| | | | | 709/213 |
| 2016/0028766 | A1* | 1/2016 | Valgenti | H04L 63/1416 |
| | | | | 726/23 |
| 2017/0026340 | A1* | 1/2017 | Alayli | G06F 16/25 |
| 2017/0286525 | A1* | 10/2017 | Li | G06F 16/2477 |
| 2018/0113950 | A1* | 4/2018 | Blanchflower | G06F 16/90335 |
| 2018/0314853 | A1* | 11/2018 | Oliner | G06F 21/6254 |
| 2019/0102438 | A1* | 4/2019 | Murray | G06F 40/109 |
| 2019/0243865 | A1* | 8/2019 | Rausch | G06F 16/907 |
| 2019/0311779 | A1* | 10/2019 | Song | G16B 20/30 |
| 2019/0327271 | A1* | 10/2019 | Saxena | H04L 41/16 |
| 2019/0361941 | A1* | 11/2019 | Rogynskyy | G16H 50/20 |
| 2019/0362290 | A1* | 11/2019 | Rogynskyy | G06F 16/235 |
| 2019/0391977 | A1* | 12/2019 | Taylor | G06F 16/24556 |
| 2020/0026711 | A1* | 1/2020 | Blom | G06F 8/34 |
| 2020/0372016 | A1* | 11/2020 | Rogynskyy | G06Q 10/10 |
| 2020/0372075 | A1* | 11/2020 | Rogynskyy | G06F 40/295 |
| 2021/0027182 | A1* | 1/2021 | Harris | G06N 20/20 |
| 2021/0081613 | A1* | 3/2021 | Begun | G06N 3/088 |
| 2021/0248443 | A1* | 8/2021 | Shu | H04L 63/1416 |
| 2021/0273899 | A1* | 9/2021 | Bastide | G06N 20/00 |
| 2021/0303416 | A1* | 9/2021 | Brenner | G06F 3/0643 |
| 2022/0121689 | A1* | 4/2022 | James | G06F 16/24568 |
| 2022/0147714 | A1* | 5/2022 | Reyderman | H04L 51/42 |
| 2023/0023645 | A1* | 1/2023 | Retinraj | G06N 3/042 |
| 2024/0273094 | A1* | 8/2024 | Seul | G06F 16/2443 |
| 2024/0311353 | A1* | 9/2024 | Hao | G06F 16/2365 |

FOREIGN PATENT DOCUMENTS

| | | |
|---|---|---|
| CN | 111488327 A | 8/2020 |
| CN | 111752936 A | 10/2020 |

* cited by examiner

|  | Customer code | Contract number | Customer profile | Customer name |
|---|---|---|---|---|
| 1 | KH000001 | SG1234 | Large enterprise, founded in 1991, specializing in patent business | Enterprise 1 |
| 2 | KH000002 | SG1235 | Sichuan food enterprise | Enterprise 2 |
| 3 | AH100001 | SG1278 | Mainly engaged in door and window cement | Enterprise 3 |
| 4 | AH200002 | SG1456 | Global-leading ICT infrastructure and intelligent terminal provider | Enterprise 4 |
| ... | ... | ... | ... | ... |
| 100 | KH100001 | SG1689 | Mainly engaged in game development and social services | Enterprise 100 |

A recommended data standard is: 

Data standard: DB0001

Standard name: customer code;

Prefix data pattern: KH{digit}[6 digits], AH{digit}[6 digits];

General pattern: {English uppercase}[2 digits]{digit}[6 digits];

Value range: KH[000000-999999], AH[000000-999999];

Data type: character type;

Data length: 8 digits;

Data precision: none;

Confirm

FIG. 6

DATA GOVERNANCE METHOD AND APPARATUS, AND STORAGE MEDIUM

CROSS-REFERENCE TO RELATED APPLICATIONS

This is a continuation of Int'l Patent App. No. PCT/CN2022/091791, filed on May 9, 2022, which claims priority to Chinese Patent App. No. 202111422755.7, filed on Nov. 26, 2021, and Chinese Patent App. No. 202210179899.2, filed on Feb. 25, 2022, all of which are incorporated by reference.

FIELD

This disclosure relates to the computer field, and in particular, to a data governance method and apparatus, and a storage medium.

BACKGROUND

A database table usually includes at least one column, and each column is used to store at least one piece of data. Any column of data in the database table can be associated with a data standard. The data standard is used to regulate normativity of data that needs to be saved to the column. For example, the data standard defines a format, a type, and/or a length of data that can be saved to the column.

Currently, a skilled person may manually generate a data standard for any column of data in the database table, and associate the column of data in the database table with the data standard. Alternatively, a skilled person manually selects a data standard for any column of data in the database table from a large number of data standards that have been generated, and associates the selected data standard with the column of data in the database table.

Currently, a data standard associated with any column of data in the database table is either manually generated by a skilled person or manually selected by a skilled person, resulting in low efficiency and precision of obtaining the data standard.

SUMMARY

This disclosure provides a data governance method and apparatus, and a storage medium, to improve efficiency and precision of obtaining a data standard. The technical solutions are as follows.

According to a first aspect, in a data governance method, a storage file is read from a database server. The storage file is used to store data that belongs to at least one service. At least one data pattern of a first data set is obtained. The first data set includes data that belongs to a same service and that is stored in the storage file, and the at least one data pattern indicates a structure of each piece of data included in the first data set. At least one data feature of the first data set is obtained based on the at least one data pattern. A first data standard is obtained based on the at least one data feature. The first data standard is used to regulate normativity of each piece of data included in the first data set. In this way, the at least one data pattern of the first data set is obtained, and the first data standard associated with the first data set is automatically obtained based on the at least one data pattern, thereby improving efficiency and precision of obtaining the data standard.

In a possible implementation, the storage file is a structured data file, the structured data file stores, in a list form, data that belongs to the at least one service, and the data that belongs to the same service is stored in a same column of the structured data file. In this way, a column of data is directly obtained from the storage file to form the first data set, thereby simplifying complexity of obtaining the first data set.

In a possible implementation, the storage file is a semi-structured data file, the semi-structured data file stores, in a label block form, the data that belongs to the at least one service, and the data that belongs to the same service is stored in a same label block of the semi-structured data file. In this way, data in a same label block is directly obtained from the storage file to form the first data set, thereby simplifying complexity of obtaining the first data set.

In another possible implementation, the at least one data pattern includes a basic data pattern, the basic data pattern indicates a basic structure of each piece of data included in the first data set, and the basic structure includes one or more of the following: an English-digit hybrid structure, an integer structure, a floating-point number structure, a Boolean structure, an address structure, an identifier structure, or a date structure. Because the basic data pattern indicates the basic structure of each piece of data included in the first data set, the first data standard can be obtained based on the data pattern of the first data set.

In another possible implementation, each piece of data in the first data set is identified based on at least one specified regular expression, to obtain the basic data pattern.

In another possible implementation, the at least one data pattern further includes a prefix data pattern, the prefix data pattern indicates a plurality of pieces of data that are in the first data set and that include a first prefix, the first prefix is a longest common prefix of the plurality of pieces of data, and parts other than the first prefix in each of the plurality of pieces of data correspond to a same basic data pattern.

In another possible implementation, each piece of data corresponding to a first data pattern is obtained from the first data set. The at least one data pattern includes the first data pattern. A data occurrence quantity and/or a data occurrence frequency corresponding to the first data pattern is obtained based on each piece of obtained data. The at least one data feature includes the data occurrence quantity and/or the data occurrence frequency corresponding to the first data pattern. In this way, the data feature is obtained based on the data pattern, and the data feature includes a distribution feature corresponding to the data pattern, thereby enriching content of the data feature.

In another possible implementation, a type of the data in the first data set is obtained based on the at least one data pattern. The at least one data feature of the first data set is obtained based on the type of the data in the first data set. In this way, the data type is obtained based on the data pattern, and the data feature is obtained using the data type, thereby enriching manners of obtaining the data feature.

In another possible implementation, the first data set includes first data, a type of the first data includes one or more of the following: a basic type or a technology type of the first data, the basic type is used to describe a data component of the first data, and the technology type is used to describe a function implemented by the first data. In this way, content of the data type is enriched.

In another possible implementation, the basic type of the first data is an integer, a floating-point number, or a Boolean type, and the technology type of the first data is a code type, a coding type, a flag type, a category type, a description type, or a metric type. In this way, content of the data type is enriched.

In another possible implementation, a statistical feature is obtained based on each piece of data that belongs to a first type and that is included in the first data set. The statistical feature includes a maximum value, a minimum value, an average value, a deviation, a variance, a median, a percentile, and/or a standard deviation of each piece of data that belongs to the first type, the first type includes an integer, a floating-point number, a metric type, and/or a coding type, and the at least one data feature includes the statistical feature; and/or a distribution feature is obtained based on each piece of data that belongs to a second type and that is included in the first data set. The distribution feature includes an occurrence quantity and/or an occurrence frequency of each piece of data that belongs to the second type, the second type includes a flag type, a Boolean type, a category type, and/or a code type, and the at least one data feature includes the distribution feature. In this way, a data feature is obtained based on a data type, and the data feature is obtained using the data type, thereby enriching manners of obtaining the data feature.

In another possible implementation, the first data set includes second data, a data structure of the second data is an English-digit hybrid structure, each piece of data that belongs to the first type includes a digital part in the second data, and each piece of data that belongs to the second type includes an English part in the second data. In this way, content of the data feature can be enriched.

In another possible implementation, the data feature of the first data set includes at least one segmented word, the at least one segmented word is obtained by performing segmentation on third data and removing a stop word, and the third data includes service attribute description information corresponding to the first data set and/or data of a description type in the first data set. In this way, content of the data feature can be enriched, and in addition, the stop word is removed, so as to prevent the stop word from affecting precision of obtaining the data standard.

In another possible implementation, the data feature of the first data set includes a data occurrence quantity and/or a data occurrence frequency corresponding to a first language, and a language to which the data of the description type in the first data set belongs includes the first language. In this way, content of the data feature can be enriched.

In another possible implementation, a connected graph to which the first data set belongs is determined based on at least one data feature. Nodes in the connected graph are different data sets, and a similarity between a neighboring node of the first data set and the first data set exceeds a specified threshold. The first data standard is obtained based on a data set included in the connected graph. Because data sets in the connected graph are similar, a data standard can be accurately summarized based on the data sets included in the connected graph, thereby improving precision of obtaining the data standard.

In another possible implementation, the connected graph to which the first data set belongs is determined based on the at least one data feature and a service type of the data in the first data set. The service type of the data is a date, a region, an IP address, or an identifier. Because the service type is added when the connected graph is determined, precision of determining the connected graph is improved.

In another possible implementation, at least one data standard is obtained. The at least one data standard includes a data standard associated with another data set other than the first data set in the connected graph. One data standard is selected as the first data standard from the at least one data standard based on an association frequency of each data standard in the at least one data standard. In this way, precision of obtaining the first data standard can be improved using the association frequency.

In another possible implementation, the data standard associated with the another data set is updated to the first data standard. The data standard associated with the another data set is the same as the first data standard, and the data standard associated with the another data set is updated to the first data standard, such that a duplicate data standard can be removed.

In another possible implementation, the first data standard is generated based on at least one data pattern and/or at least one data feature of each data set in the connected graph. In this way, the data standard is automatically generated, and efficiency and precision of generating the data standard are improved.

In another possible implementation, the normativity includes data integrity, data consistency, and/or data accuracy, the first data standard includes first standard content, second standard content, and/or third standard content, the first standard content is used to regulate data integrity of the first data set, the second standard content is used to regulate data consistency of the first data set, and the third standard content is used to regulate data accuracy of the first data set.

In another possible implementation, the first standard content is generated based on a distribution feature of data in each data set; and/or the second standard content is generated based on the at least one data pattern of each data set; and/or the third standard content is generated based on a distribution feature and/or a statistical feature of data in each data set. In this way, the data standard is automatically generated, and efficiency and precision of generating the data standard are improved.

According to a second aspect, a data governance apparatus is configured to perform the method according to any one of the first aspect or the possible implementations of the first aspect. The apparatus may include a unit that is configured to perform the method according to any one of the first aspect and the possible implementations of the first aspect.

According to a third aspect, a computer device includes at least one processor and a memory. The at least one processor is configured to: be coupled to the memory, and read and execute instructions in the memory, to implement the method according to any one of the first aspect or the possible implementations of the first aspect.

According to a fourth aspect, a computer program product includes a computer program stored in a computer-readable storage medium, and the computer program is loaded by a processor to implement the method according to any one of the first aspect or the possible implementations of the first aspect.

According to a fifth aspect, a computer-readable storage medium is configured to store a computer program, and the computer program is loaded by a processor to perform the method according to any one of the first aspect or the possible implementations of the first aspect.

According to a sixth aspect, a chip includes a memory and a processor. The memory is configured to store computer instructions, and the processor is configured to invoke the computer instructions from the memory and run the computer instructions, to perform the method according to any one of the first aspect or the possible implementations of the first aspect.

BRIEF DESCRIPTION OF THE DRAWINGS

FIG. 6 is a schematic diagram of a display interface according to an embodiment;

DETAILED DESCRIPTION

The following further describes in detail implementations with reference to the accompanying drawings.

Figure 1:
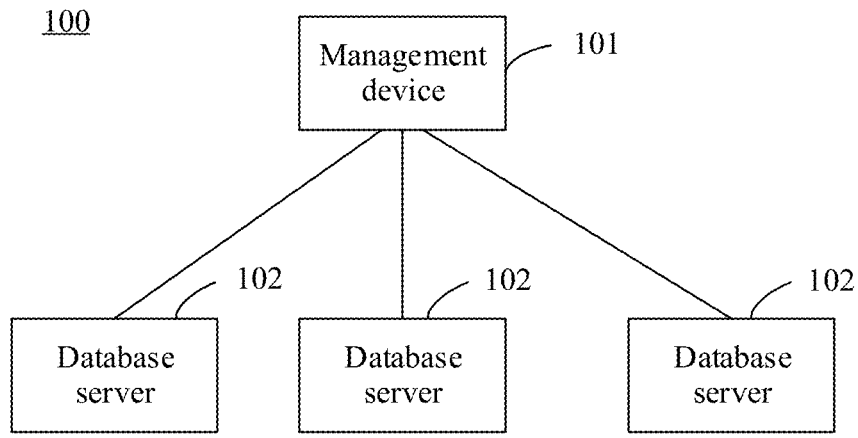
FIG. 1 is a schematic diagram of a network architecture according to an embodiment.

As shown in FIG. 1, an embodiment provides a network architecture 100, including:

a management device 101 and a database server 102, where the management device 101 communicates with the database server 102.

In some embodiments, a quantity of database servers 102 is greater than or equal to 1, that is, the network architecture 100 includes at least one database server 102. The management device 101 and the at least one database server 102 are connected to a communication network, and the management device 101 communicates with each database server 102 through the communication network.

In some embodiments, each database server 102 includes a database, and each database server 102 is configured to store data. For each database server 102, the database in the database server 102 includes at least one storage file, and the storage file is used to store data. The storage file is used to store data that belongs to at least one service. Optionally, the storage file is used to store at least one data set, and each data set includes data that belongs to a same service.

In some embodiments, the management device 101 is configured to manage the at least one database server 102.

Figure 2:
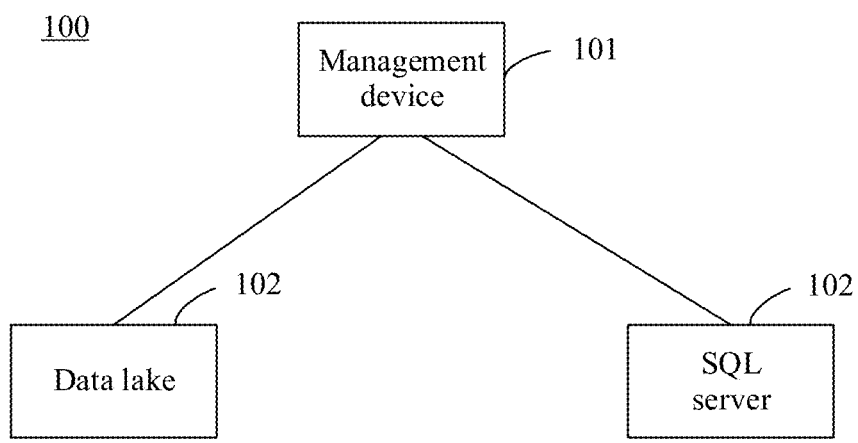
FIG. 2 is a schematic diagram of another network architecture according to an embodiment.

For example, as shown in FIG. 2, the at least one database server 102 includes a data lake, a structured query language (SQL) server. The data lake and the SQL server are all database servers configured to store data. The management device 101 is configured to manage the data lake, the SQL server, and the like.

For any database server 102, storage files in the database server 102 include a structured data file and/or a semi-structured data file, and both the structured data file and the semi-structured data file are files used to store data.

The structured data file is used to store data in a list form. Each column in the structured data file is used to store data of a service, that is, each column is a data set. Optionally, the structured data file is a database table, for example, a structured data file shown in the following Table 1. The structured data file stores data using a list. The structured data file shown in Table 1 is a database table, the database table includes four columns of data, and the four columns of data are four different data sets. A service to which data stored in the first column belongs is customer code, that is, the first column is used to store the customer code. A service to which data stored in the second column belongs is a contract number, that is, the second column is used to store the contract number. A service to which data stored in the third column belongs is a customer profile, that is, the third column is used to store the customer profile. A service to which data stored in the fourth column belongs is a customer name, that is, the fourth column is used to store the customer name.

TABLE 1

| | Customer information list | | | |
|---|---|---|---|---|
| | Customer code | Contract number | Customer profile | Customer name |
| 1 | KH000001 | SG1234 | A large enterprise, founded in 1991, specializing in patent business | Enterprise 1 |
| 2 | KH000002 | SG1235 | A Sichuan food enterprise | Enterprise 2 |
| 3 | AH100001 | SG1278 | Mainly engaged in door and window cement | Enterprise 3 |
| 4 | AH200002 | SG1456 | A global-leading ICT infrastructure and intelligent terminal provider | Enterprise 4 |
| ... | ... | ... | ... | ... |
| 100 | KH100001 | SG1689 | Mainly engaged in game development and social services | Enterprise 100 |

The semi-structured data file is used to store data in a label block form. The semi-structured data file is a storage file in a non-list form. In the semi-structured data file, data that belongs to a same service is stored in a label block set, that is, each data set in a data set is stored in a label block in the semi-structured data file. Optionally, the structured data file is an Extensible Markup Language (xml) file or the like, for example, a semi-structured data file 1 shown below, data that belongs to the customer code "KH000001", "KH000002", "AH100001", "AH200002", ..., and "KH100001" is stored in a label block in the xml file in a centralized manner. The <customer code> is the start label of the label block, the </customer code> is the end label of the label block. Data that belongs to the contract numbers "SG1234", "SG1235", "SG1278", "SG1456", ..., and "SG1689" is stored in a label block in the xml file in a centralized manner. The <contract number> is the start label of the label block, and the </contract number> is the end label of the label block. Data that belongs to the customer profiles "A large enterprise, founded in 1991, specializing in patent business", "A Sichuan food enterprise", "Mainly engaged in door and window cement", "A global-leading ICT infrastructure and intelligent terminal provider", ..., and "Mainly engaged in game development and social services" is stored in a label block in the xml file in a centralized manner. The <customer profile> is the start label of the label block, and the </customer profile> is the end label of the label block. Data that belongs to the customer names "Enterprise 1", "Enterprise 2", "Enterprise 3", "Enterprise 4", ..., and "Enterprise 100" is stored in a label block in the xml file in a centralized manner. The <customer name> is the start label of the label block, and the </customer name> is the end label of the label block.

In other words, the semi-structured data file 1 shown below includes four data sets: a data set 1, a data set 2, a data set 3, and a data set 4. The data set 1 includes the following customer code: "KH000001", "KH000002", "AH100001", "AH200002", ..., and "KH100001". The data set 2 includes the following contract numbers: "SG1234", "SG1235", "SG1278", "SG1456", ..., and "SG1689". The data set 3 includes the following customer profiles: "A large enterprise, founded in 1991, specializing in patent business", "A Sichuan food enterprise", "Mainly engaged in door and window cement", "A global-leading ICT infrastructure and intelligent terminal provider", . . . , "Mainly engaged in game development and social services". The data set 4 includes the following customer names: "Enterprise 1", "Enterprise 2", "Enterprise 3", "Enterprise 4", . . . , and "Enterprise 100".

Semi-Structured Data File 1:

```
<title>Customer information</title>
  Customer code (data set 1)
    KH000001;
    KH000002;
    AH100001;
    AH200002;
    ...
    KH100001;
  </Customer code>
  <Contract number> (data set 2)
    SG1234;
    SG1235;
    SG1278;
    SG1456;
    ...
    SG1689;
  </Contract number>
  </Customer profile> (data set 3)
    A large enterprise, founded in 1991, specializing in patent business;
    A Sichuan food enterprise;
    Mainly engaged in door and window cement;
    A global-leading ICT infrastructure and intelligent terminal provider;
    ...
    Mainly engaged in game development and social services;
  </Customer profile>
  <Customer name> (data set 4)
    Enterprise 1;
    Enterprise 2;
    Enterprise 3;
    Enterprise 4;
    ...
    Enterprise 100;
  </Customer name>
<a/>
```

It should be noted that, for a row of data in any column in the structured data file shown in Table 1, the row of data may be null, where the null indicates that a user does not store data in the row of the column, and a database system automatically stores a preset null in the row of the column. Similarly, the database system may also store a null in the semi-structured data file.

For a storage file included in any one of the foregoing servers 102, for any data set included in the storage file, the data set is associated with a data standard. The data standard is used to regulate normativity of each piece of data included in the data set. In other words, when data is stored in the data set, the data needs to meet normativity indicated by the data standard, and the data can be stored in the data set only when the data meets the normativity indicated by the data standard.

In some embodiments, the normativity includes data integrity, data consistency, and/or data accuracy. The data standard includes first standard content, second standard content, and/or third standard content, the first standard content is used to regulate data integrity of the data set, the second standard content is used to regulate data consistency of the data set, and the third standard content is used to regulate data accuracy of the data set. Optionally, the data standard further includes other content such as a standard name and/or a standard number.

Figure 3:
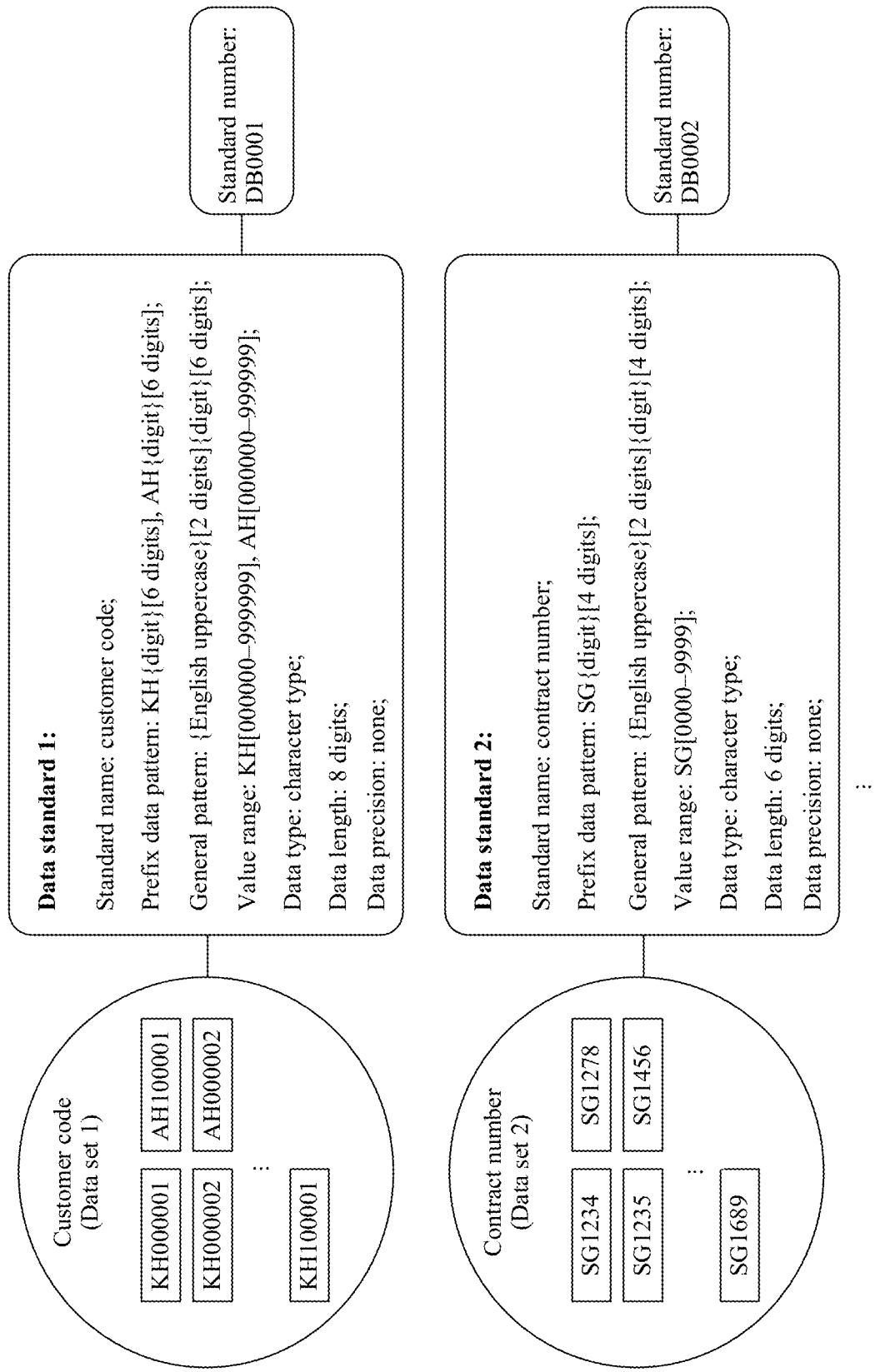
FIG. 3 is a schematic diagram of a data standard according to an embodiment.

For example, as shown in FIG. 3, for a data set 1 including customer code, a data standard 1 associated with the data set 1 is shown as follows. First standard content in the data standard 1 includes a data length "8 digits". For to-be-stored data that can be stored in the data set 1, the first standard content defines: A length of the to-be-stored data is 8 digits, so as to regulate integrity of the to-be-stored data. Optionally, the first standard content further indicates whether a null is allowed to be input into the data set 1. Second standard content in the data standard 1 includes a prefix data pattern "KH{digit}[6 digits], AH{digit}[6 digits]", a general pattern "{English size}[2 digits] {digit}[6 digits]" and a data type "character type", and the second standard content defines: The to-be-stored data is formed by "KH" and 6 digits or is formed by "AH" and 6 digits, so as to regulate consistency of the to-be-stored data. Third standard content in the data standard 1 includes a value range "KH[000000-999999], AH[000000-999999]", and the third standard content defines: 6 digits in the to-be-stored data need to be greater than or equal to 000000 and less than or equal to 999999, so as to regulate accuracy of the to-be-stored data.

Data Standard 1

```
{
  Standard name: customer code;
  Standard number: DB0001;
  Prefix data pattern: KH{digit} [6 digits], AH{ digit} [6 digits];
  General pattern: {English size} [2 digits]{digit} [6 digits];
  Value range: KH[000000-999999], AH[000000-999999];
  Data type: character type;
  Data length: 8 digits;
  Data precision: none
}.
```

For a meaning of the data standard 2 in FIG. 3, refer to the foregoing descriptions of the data standard 1. Details are not described herein again.

For any data set in the server 102, the management device 101 may obtain a data standard for the data set, and associate the data standard with the data set. In this way, when data is stored in the data set, the server 102 first determines whether the data conforms to normativity defined by the data standard. If the data conforms to the normativity defined by the data standard, the server 102 stores the data in the data set. If the data does not conform to the normativity defined by the data standard, the server 102 discards the data, or prompts the user to modify the data.

Figure 4:
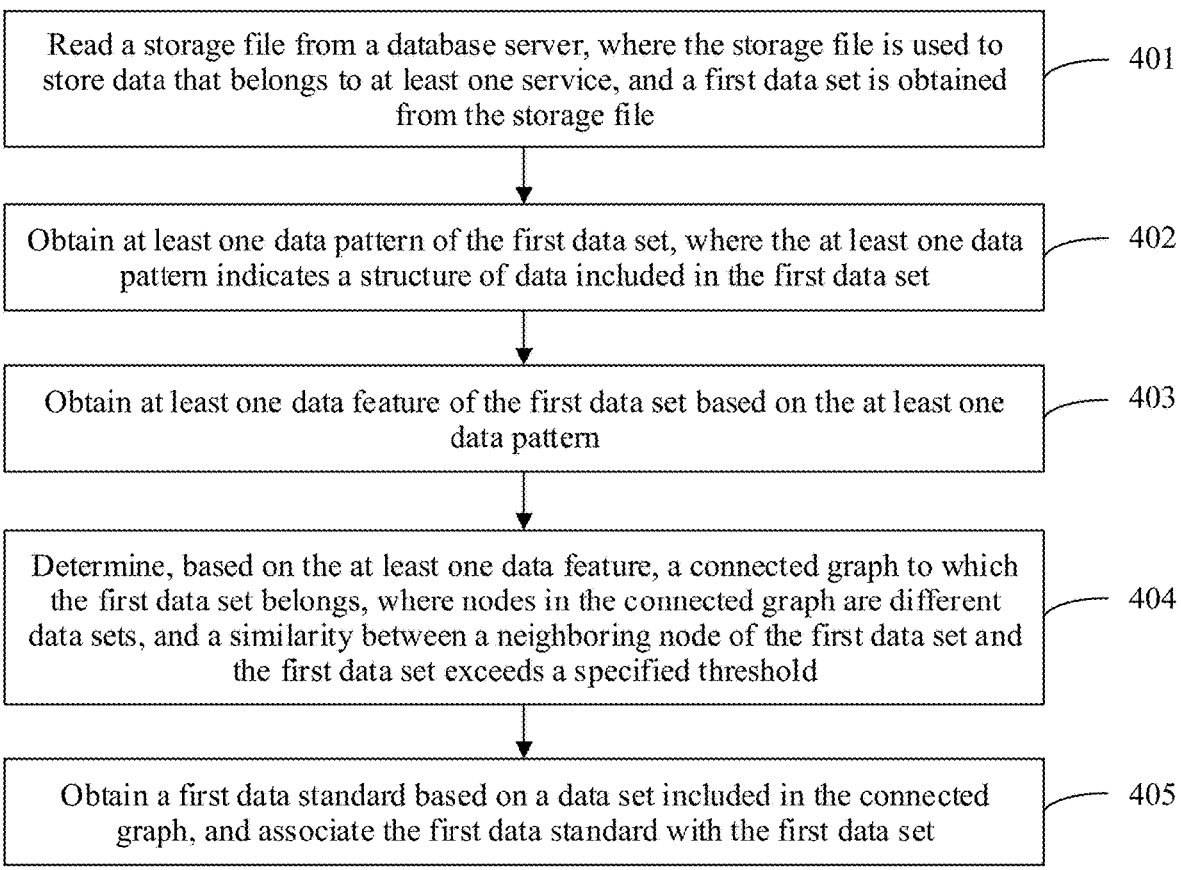
FIG. 4 is a flowchart of a data governance method according to an embodiment.
Figure 5A:
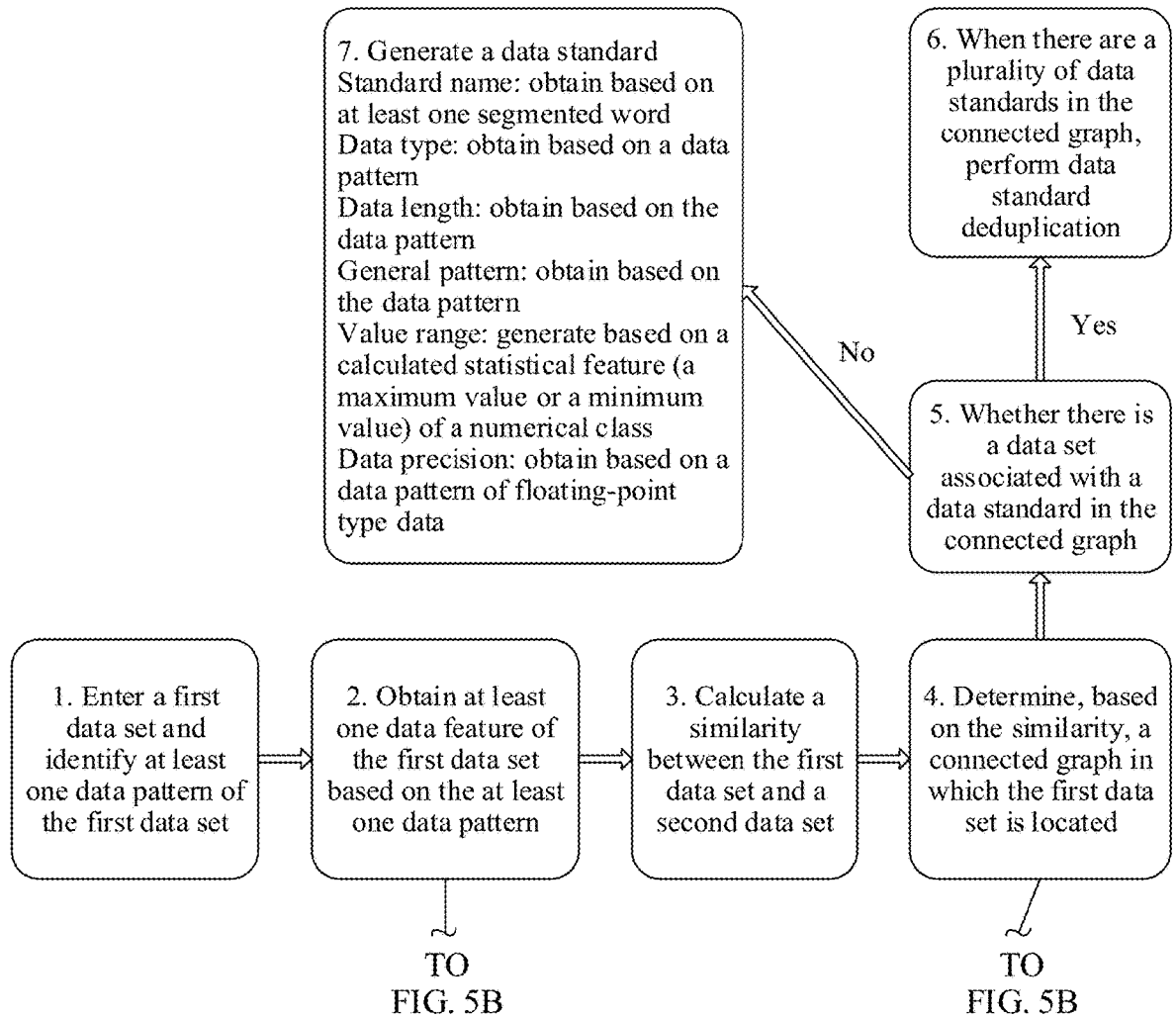
FIG. 5A and FIG. 5B are a flowchart of another data governance method according to an embodiment.
Figure 5B:
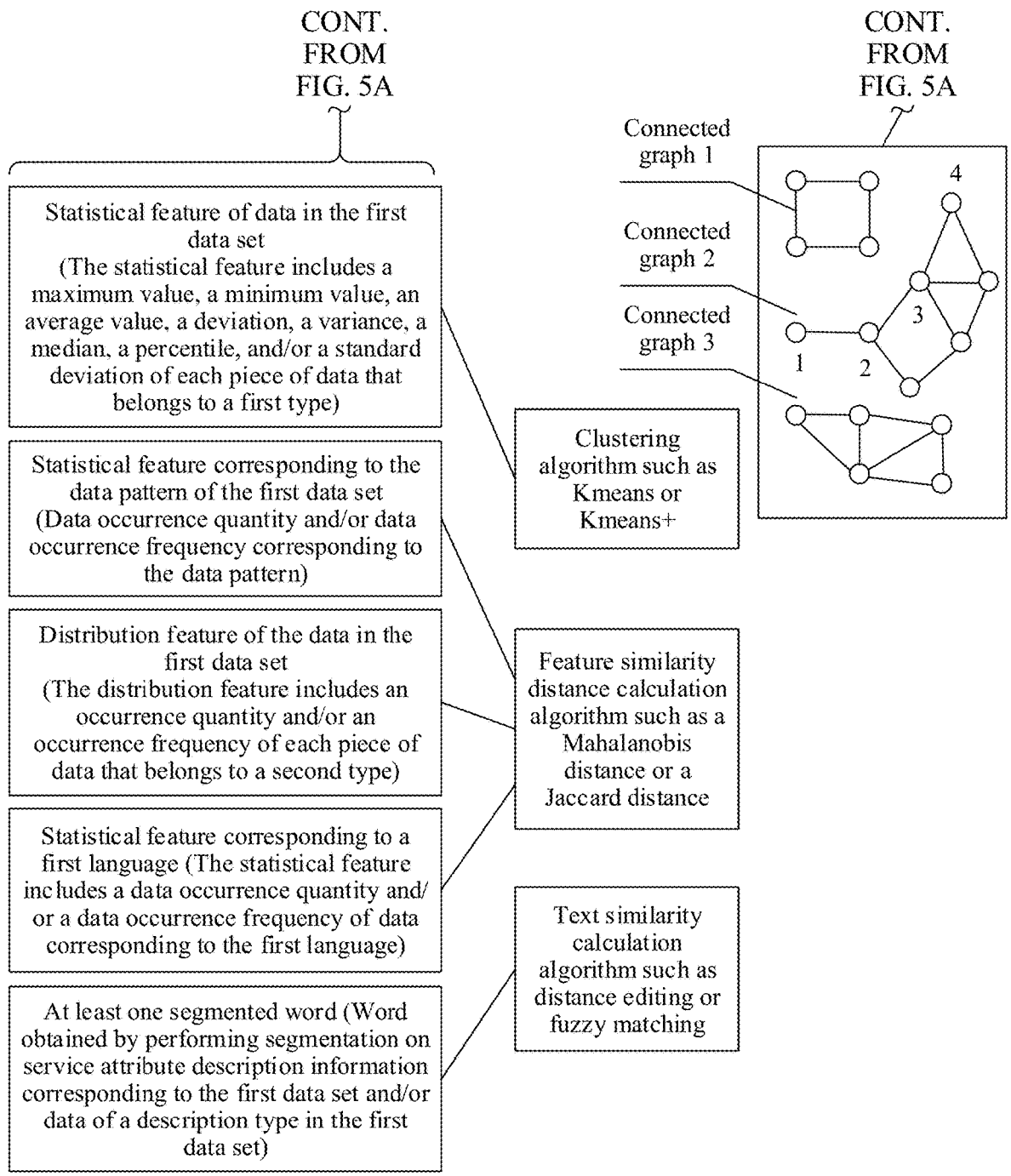

A data governance method 400 is shown in FIG. 4 and FIG. 5A and FIG. 5B. The method 400 is applied to the network architecture 100 shown in FIG. 1 or FIG. 2, and the method 400 is performed by the management device 101 in the network architecture 100 shown in FIG. 1 or FIG. 2. The method 400 includes the following steps.

Step 401: Read a storage file from a database server, where the storage file is used to store data that belongs to at least one service, and a first data set is obtained from the storage file.

In step 401, the storage file is obtained from the database server, and a data set is obtained from the storage file as the first data set. The first data set includes data belonging to a same service. Optionally, the first data set is a data set that is in the storage file and that has not been associated with a data standard, or the first data set is a data set that is in the storage file and that has been associated with a data standard.

As shown in FIG. 1 or FIG. 2, the management device communicates with at least one server, and each server includes a storage file used to store data. The management device reads, from any server, the storage file stored in the server, and obtains the first data set from the storage file.

For example, as shown in FIG. 2, the management device obtains a storage file from the data lake or the SQL server. The storage file may be a structured storage file. For example, the storage file is a database table. Alternatively, the storage file may be a semi-structured storage file. For example, the storage file is an xml file. It is assumed that the storage file is a database table, and the management device obtains a column of data from the database table as the first data set. It is further assumed that the storage file is an xml file, and the management device obtains, from the xml file, data included in a label block as the first data set.

In some embodiments, the management device further displays the storage file, and highlights the first data set in the storage file. For example, as shown in FIG. 6, it is assumed that the management device obtains the storage file from the data lake, the storage file is the database table shown in Table 1, and the first data set is a column of data in the database table (for example, the first column of data in the database table shown in Table 1, and the first column of data is the customer code). The management device displays the database table, and displays the column of data in bold in the database table, to highlight the first data set, such that a skilled person can browse.

In some embodiments, the storage file is a structured data file, and a column of data that is not associated with the data standard is obtained from the structured data file as the first data set, or a column of data that is associated with the data standard is obtained from the structured data file as the first data set. For example, refer to the structured data file shown in Table 1. It is assumed that none of the four columns of data in the structured data file is associated with the data standard. The first column of data is read from the structured data file as the first data set, that is, the first data set includes the customer code "KH000001", "KH000002", "AH100001", "AH200002", . . . , and "KH100001"

In some embodiments, the storage file is a semi-structured data file, and a data set that is not associated with the data standard is obtained from the semi-structured data file as the first data set, or a column of data that is associated with the data standard is obtained from the structured data file as the first data set. For example, refer to the semi-structured data file 1. It is assumed that none of the four data sets in a structured data file 1 is associated with the data standard. The data set 1 is read from the structured data file 1 as the first data set, that is, the first data set includes the customer code "KH000001", "KH000002", "AH100001", "AH200002", . . . , and "KH100001".

Step 402: Obtain at least one data pattern of the first data set, where the at least one data pattern indicates a structure of data included in the first data set.

The at least one data pattern includes a basic data pattern. Optionally, the basic data pattern indicates a basic structure of each piece of data included in the first data set. Optionally, the basic structure includes one or more of the following: an English-digit hybrid structure, an integer structure, a floating-point number structure, a text structure, a Boolean structure, an Internet Protocol (IP) address structure, an identifier structure, or a date structure.

In some embodiments, the management device includes at least one specified regular expression. In step 402, each piece of data in the first data set is identified based on the at least one specified regular expression, to obtain at least one basic data pattern corresponding to the first data set.

For example, the management device includes a regular expression "\d" of a digit, a regular expression "[a-z]" of English lowercase letters, a regular expression "[A-Z]" of English uppercase letters, a regular expression "^China$|^UK$ . . . " of a region, and/or a regular expression "^(19|20)\d\d(0[1-9]|1[0-2])(0[1-9]|1[1-2]\d|3[0-1])$" of a date.

In step 402, for any piece of data in the first data set, for ease of description, the data is referred to as first data, and the first data is identified suing each regular expression in the at least one regular expression, to obtain at least one basic data pattern. The at least one basic data pattern includes a basic data pattern corresponding to the first data. Optionally, the at least one basic data pattern further includes a basic data pattern corresponding to each piece of subdata in the first data.

The first data may include at least one piece of subdata. For each piece of subdata, the subdata includes at least one consecutive data element, and each data element in the subdata is a data element of a same type.

For example, it is assumed that the first data is "KH000001", the first data "KH000001" includes first subdata and second subdata, the first subdata is "KH", and the second subdata is "000001". The first subdata includes two data elements, which are respectively "K" and "H", and the two data elements are both in English uppercase. The second subdata includes six data elements, the six data elements include five data elements "0" and one data element "1", and the six data elements are all digits. The first data "KH000001" is identified suing at least one regular expression, to obtain three basic data patterns. The three basic data patterns include a basic data pattern 1 corresponding to the first data "KH000001", a basic data pattern 2 corresponding to the first subdata "KH", and a basic data pattern 3 corresponding to the second subdata "000001".

The basic data pattern 1 is {English uppercase}[2 digits]{digit}[6 digits], and the basic data pattern 1 indicates that the first data "KH000001" consists of two data elements in English uppercase and six data elements in digits, and there are eight data elements in total. The basic data pattern 2 is {English uppercase}[2 digits], and the basic data pattern 2 indicates that the first subdata "KH" consists of two data elements in English uppercase. The basic data pattern 3 is {digit}[6 digits], and the basic data pattern 3 indicates that the second subdata "000001" consists of six data elements.

For another example, it is assumed that the first data is "A global-leading ICT infrastructure and intelligent terminal provider", the first data includes third subdata, fourth subdata, and fifth subdata, the third subdata is "global-leading", the fourth subdata is "ICT", and the fifth subdata is "infrastructure and intelligent terminal provider". The third subdata "global-leading" includes five data elements, and the five data elements are all Chinese characters. The fourth subdata "ICT" includes three data elements, and the three data elements are all uppercase letters. The fifth subdata "infrastructure and intelligent terminal provider" includes 12 data elements, and all the 12 data elements are Chinese characters. The first data is identified suing at least one regular expression, to obtain four basic data patterns. The four basic data patterns include a basic data pattern 4 corresponding to the first data, a basic data pattern 5 corresponding to the third subdata, a basic data pattern 6 corresponding to the fourth subdata, and a basic data pattern 7 corresponding to the fifth subdata.

The basic data pattern 4 is {Chinese}[5 digits]{English uppercase}[3 digits]{Chinese}[12 digits], and the basic data pattern 4 indicates that the first data includes five-digit data elements of Chinese characters, three-digit data elements of uppercase letters, and 12-digit data elements of Chinese characters, and there are 20-digit data elements in total. The basic data pattern 5 is {Chinese}[5 digits], and the basic data pattern 5 indicates that the third subdata consists of five-digit data elements of Chinese characters. The basic data pattern 6 is {English uppercase}[3 digits], and the basic data pattern 6 indicates that the fourth subdata consists of three-digit data elements of uppercase letters. The basic data pattern 7 is {Chinese}[12 digits], and the basic data pattern 7 indicates that the fifth subdata consists of 12-digit Chinese characters.

If the basic data pattern corresponding to the first data indicates that the first data includes a type of data element, for example, assuming that the basic data pattern corresponding to the first data indicates that the first data includes a data element of a digit, the basic structure of the first data is an integer structure. Assuming that the basic data pattern corresponding to the first data indicates that the first data includes a data element of a digit and a data element of an English language, the basic structure of the first data is an English-digit hybrid structure. Assuming that the basic data pattern corresponding to the first data indicates that the first data includes a data element of a digital and a data element of a decimal point, and data elements before and after the decimal point are both digits, the basic structure of the first data is a floating-point number structure. Assuming that the basic data pattern corresponding to the first data indicates that the first data is "true or false", the basic structure of the first data is a Boolean structure. Assuming that the basic data pattern corresponding to the first data indicates that the first data is of a date type, the basic structure of the first data is a date structure. Assuming that the basic data pattern corresponding to the first data indicates that the first data is an address, the basic structure of the first data is an address structure. Assuming that the basic data pattern corresponding to the first data indicates that the first data is an identifier, the basic structure of the first data is an identifier structure.

In some embodiments, the at least one data pattern may further include a prefix data pattern, the prefix data pattern indicates a plurality of pieces of data that are in the first data set and that include a first prefix, the first prefix is a longest common prefix of the plurality of pieces of data, and parts other than the first prefix in each of the plurality of pieces of data correspond to a same basic data pattern. The prefix data pattern includes a first prefix and the basic data pattern.

A prefix data pattern corresponding to the first data set may include one or more prefix data patterns, and each prefix data pattern corresponds to a different prefix. Optionally, a plurality of pieces of data including a same prefix are determined in the first data set based on the at least one basic data pattern. For ease of description, a longest common prefix included in the plurality of pieces of data is referred to as the first prefix, and parts other than the first prefix in each piece of data in the plurality of pieces of data correspond to a same basic data pattern.

For example, it is assumed that the first data set includes a plurality of pieces of data such as "KH000001", "KH000002", . . . , and "KH100001". Based on the basic data pattern 1, the basic data pattern 2, and the basic data pattern 3, "KH000001", "KH000002", . . . , and "KH100001" including the first prefix "KH" are determined in the first data set. The first prefix "KH" is a longest common prefix in "KH000001", "KH000002", . . . , and "KH100001", and a basic data pattern corresponding to data other than "KH" in each piece of data is {digit}[6 digits]. Therefore, a prefix data pattern 1 indicating "KH000001", "KH000002", . . . , and "KH100001" is KH{digit}[6 digits], that is, the prefix data pattern 1 includes a first prefix "KH" and a basic data pattern "{digit}[6 digits]" corresponding to data other than the first prefix "KH" in each piece of data. Similarly, a prefix data pattern 2 is further obtained from the first data set, and the prefix data pattern 2 is AH{digit}[6 digits].

In some embodiments, for a plurality of pieces of data corresponding to any prefix data pattern, the prefix data pattern can be further divided at a finer granularity based on a suffix of each piece of data, to obtain a data pattern of a finer granularity, that is, a plurality of fine granularity data patterns corresponding to the prefix data pattern are obtained. For the plurality of pieces of data corresponding to the prefix data pattern, the plurality of pieces of data include data corresponding to each fine granularity data pattern, data corresponding to any fine granularity data pattern includes a first suffix, and the first suffix is a longest common suffix included in the data corresponding to the fine granularity data pattern.

In conclusion, a data pattern of the first data includes a basic data pattern corresponding to the first data, a basic data pattern corresponding to each subdata in the first data, a prefix data pattern corresponding to the first data, a fine granularity data pattern corresponding to the first data, and/or the like. The at least one data pattern of the first data set includes a data pattern corresponding to each piece of data in the first data set. Data patterns corresponding to data in the first data set may be the same, or data patterns corresponding to some data in the first data set may be the same.

Step 403: Obtain at least one data feature of the first data set based on the at least one data pattern.

The at least one data feature of the first data set includes different data features, and the different data features are obtained in different manners. The following describes in detail a process of obtaining a data feature in the following cases.

First, the at least one data feature includes a statistical feature corresponding to a data pattern of the first data set. For any data pattern of the first data set, for ease of description, the data pattern is referred to as a first data pattern, and a statistical feature corresponding to the first data pattern is used to reflect a statistical situation of data corresponding to the first data pattern in the first data set. Optionally, the statistical feature corresponding to the first data pattern includes a data occurrence quantity and/or a data occurrence frequency corresponding to the first data pattern.

In some embodiments, for the data occurrence quantity and/or the data occurrence frequency corresponding to the first data pattern, each piece of data corresponding to the first data pattern is obtained from the first data set. The data occurrence quantity and/or the data occurrence frequency corresponding to the first data pattern are/is obtained based on each piece of data. Optionally, a quantity of each piece of data is counted to obtain the data occurrence quantity corresponding to the first data pattern, and the data occurrence frequency corresponding to the first data pattern is calculated based on the quantity of each piece of data and a total quantity of data included in the first data set.

The first data pattern includes at least one basic data pattern, at least one prefix data pattern, and/or at least one fine granularity data pattern. Therefore, the statistical feature corresponding to the first data pattern includes a data occurrence quantity and/or a data occurrence frequency corresponding to each basic data pattern, a data occurrence quantity and/or a data occurrence frequency corresponding to each prefix data pattern, and/or a data occurrence quantity and/or a data occurrence frequency corresponding to each fine granularity data pattern.

For example, it is assumed that the first data set includes 100 pieces of customer code, and the 100 pieces of customer code are "KH000001", "KH000002", "AH100001", "AH200002", . . . , and "KH100001". The at least one data pattern of the first data set includes the basic data pattern 1 "{English uppercase}[2 digits] {digit}[6 digits]", the basic data pattern 2 "{English uppercase}[2 digits]", the basic data pattern 3 "{digit}[6 digits]", the prefix data pattern 1 "KH{digit}[6 digits]", and the prefix data pattern 2 "AH{digit}[6 digits]". Data corresponding to the basic data pattern 1 includes the 100 pieces of customer code. Therefore, the data occurrence quantity corresponding to the basic data pattern 1 is 100, and the data occurrence frequency corresponding to the basic data pattern 1 is 100%. The 100 pieces of customer code all include data corresponding to the basic data pattern 2. For example, "KH000001" includes data "KH" corresponding to the basic data pattern 2, and "AH100001" includes data "AH" corresponding to the basic data pattern 2. Therefore, the data occurrence quantity corresponding to the basic data pattern 2 is 100, and the data occurrence frequency corresponding to the basic data pattern 2 is 100%. The 100 pieces of customer code all include data corresponding to the basic data pattern 3. For example, "KH000001" includes data "000001" corresponding to the basic data pattern 3, and "AH100001" includes data "100001" corresponding to the basic data pattern 3. Therefore, the data occurrence quantity corresponding to the basic data pattern 3 is 100, and the data occurrence frequency corresponding to the basic data pattern 3 is 100%. It is assumed that the data corresponding to the prefix data pattern 1 includes 80 pieces of customer code. Therefore, the data occurrence quantity corresponding to the prefix data pattern 1 is 80, and the data occurrence frequency corresponding to the prefix data pattern 1 is 80%. The data corresponding to the prefix data pattern 2 includes 20 pieces of customer code. Therefore, the data occurrence quantity corresponding to the prefix data pattern 2 is 20, and the data occurrence frequency corresponding to the prefix data pattern 2 is 20%.

Second, the at least one data feature includes a distribution feature and/or a statistical feature of data in the first data set.

In some embodiments, at least one data feature of the first data set is obtained suing the following operations 4031 and 4032, that is, a distribution feature and/or a statistical feature of data in the first data set are/is obtained.

4031: Obtain a type of data in the first data set based on the at least one data pattern of the first data set.

Any piece of data included in the first data set is still referred to as the first data, and the type of the first data includes one or more of the following: a basic type or a technology type of the first data.

The basic type of the first data is used to describe a data component of the first data, and the basic type of the first data is an integer, a floating-point number, a character type, a Boolean type, or the like. The technology type of the first data is used to describe a function implemented by the first data, and the technology type of the first data is a code type, a coding type, a flag type, a category type, a description type, or a metric type.

The code type indicates that the first data indicates an object. For example, the first data may be a telephone area code of an area, and the telephone area code is data of the code type, and indicates the area. For example, an area code of Beijing is 010, which indicates Beijing. Therefore, 010 is a code type data.

The encoding type indicates that the first data is a number of an object, for example, an ID column. 00001 indicates data in the first row, 00002 indicates data in the second row, and the like, 00001 is a unique number of the first row, and 00002 is a unique number of the second row.

First data of the flag type is two-category data, including "true", "false", "yes", "no", or the like.

First data of the description type is used to describe an object. For example, the foregoing enumerated data "A large enterprise, founded in 1991, specializing in patent business" is data of the description type, and is used to describe the enterprise 1.

First data of the metric type is used to measure an object. For example, the first data of the metric type may be a height, a weight, or the like, and is used to measure a body of a person.

In some embodiments, the type of the first data further includes a service type, and the service type is used to describe a service to which the first data belongs. The service type of the first data is a date type, an area, an IP address, an identifier, or the like. The identifier may be a universally unique identifier (UUID) or the like.

Figure 7A:
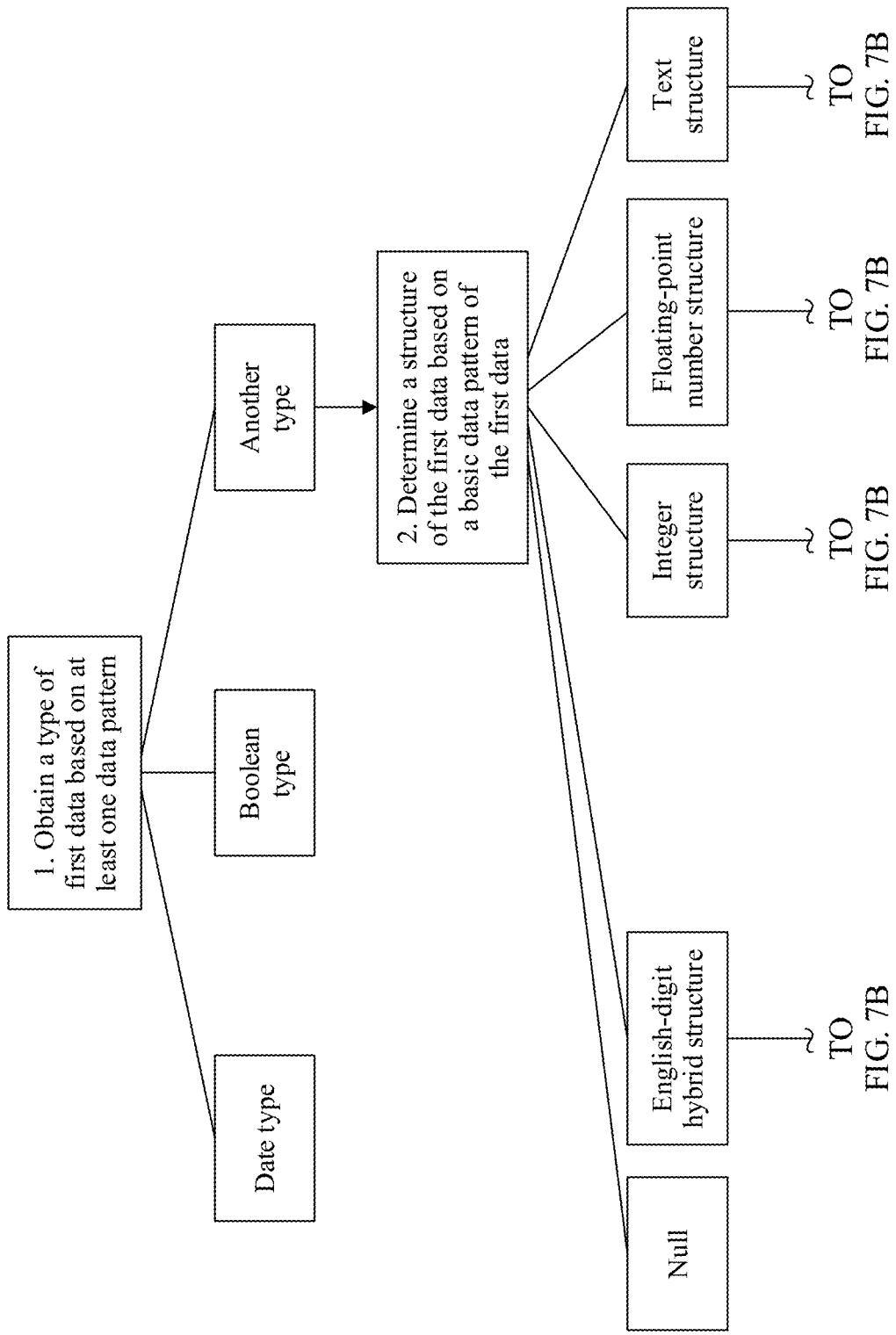
FIG. 7A and FIG. 7B are a flowchart of a data type obtaining method according to an embodiment.
Figure 7B:
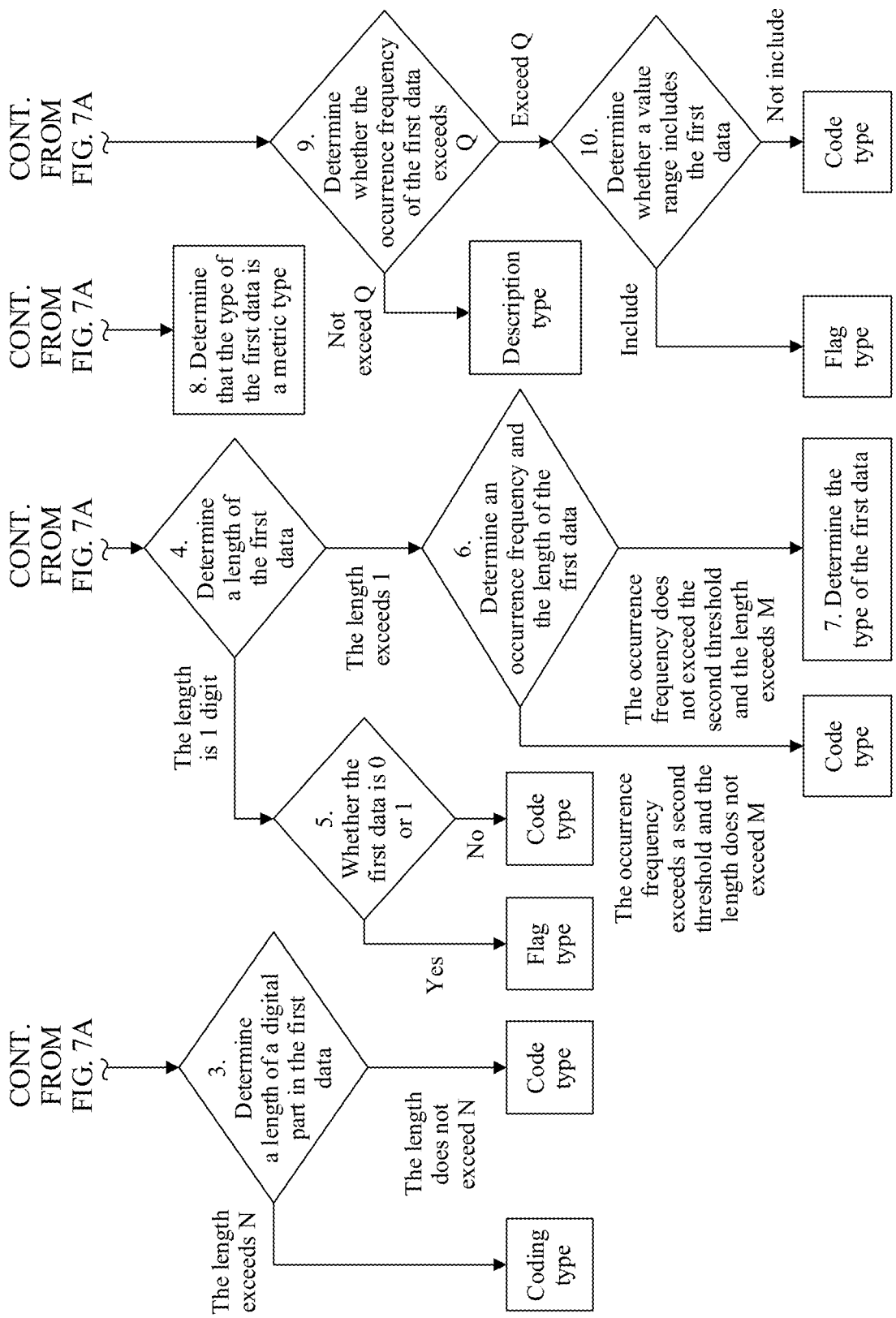

As shown in FIG. 7A and FIG. 7B, in 4031, the type of the first data is obtained suing the following operations 1 to 10, and the operations 1 to 10 are as follows.

1. Obtain, based on the at least one data pattern, whether the type of the first data is a date type, a Boolean type, or another type. The another type is a type other than the date type and the Boolean type.

The at least one data pattern includes the basic data pattern corresponding to the first data and/or the basic data pattern corresponding to each subdata in the first data. Both the basic data pattern corresponding to the data of the date type and the basic data pattern corresponding to the data of the Boolean type are fixed specified patterns. Therefore, based on the at least one data pattern, it may be obtained that the type of the first data is the date type, the Boolean type, or another type.

The Boolean type is a type of flag type. In other words, the Boolean type is the flag type. That is, if the first data is Boolean-type data, it is determined that the type of the first data is the flag type.

If the type of the first data is another type, a type of the first data is determined by performing the following operations 2 to 10.

2. If the type of the first data is another type, determine the structure of the first data based on the basic data pattern of the first data.

The first data may be a null, an English-digit hybrid structure, an integer structure, a text structure, a floating-point number structure, or the like.

3. If the structure of the first data is an English-digit hybrid structure, determine a length of a digital part in the first data. If the length exceeds N, determine that the type of the first data is a coding type, and end the process. If the length does not exceed N, determine that the type of the first data is a code type, and end the process.

N is a first threshold, and N is an integer greater than 1, for example, N=4, 5, or 6. If the length of the digital part in the first data exceeds N digits, it is determined that the type of the first data is a coding type. If the length of the digital part in the first data does not exceed N digits, it is determined that the type of the first data is a code type.

4. If the first data is an integer structure, determine a length of the first data. If the length of the first data is 1 digit, the operation 5 is performed. If the length of the first data exceeds 1 digit, the operation 6 is performed.

The first data is an integer structure, and it may be determined that the type of the first data is an integer.

5. If the first data is 0 or 1, determine that the type of the first data is a flag type, and end the process. If the first data is any value in 2 to 9, determine that the type of the first data is a code type, and end the process.

If the first data is 0 or 1, that is, 1 or 0 may be used to indicate yes or no, or 1 or 0 may be used to indicate true or false. Therefore, if the first data is 0 or 1, it is determined that the type of the first data is a flag type.

6. Obtain an occurrence frequency of the first data in the first data set. If the occurrence frequency of the first data exceeds a second threshold and the length of the first data does not exceed M, determine that the type of the first data is a code type, where M is a third threshold and M is an integer greater than 1. If the occurrence frequency of the first data does not exceed the second threshold or the length of the first data exceeds M, perform the operation 7.

Optionally, M=3, 4, 5, or the like.

If the occurrence frequency of the first data exceeds the second threshold and the length of the first data does not exceed M, it indicates that the first data is data that frequently appears and has a short length. Therefore, it is determined that the type of the first data is a code type. For example, a telephone area code is usually short data that appears frequently. Therefore, the telephone area code is a code type.

7. Determine the type of the first data based on service attribute description information corresponding to the first data set, and end the process.

If the first data set is a column of data, the service attribute description information corresponding to the first data set is a column name of the column of data and/or a table name of a database table in which the column of data is located. The service attribute description information corresponding to the first data set is read from the structured data file used to store the first data set.

If the first data set is data that belongs to a same service in the semi-structured data file, the semi-structured data file includes a label block used to store the first data set. The start label and/or the end label of the label block include the service attribute description information corresponding to the first data set, and the service attribute description information corresponding to the first data set is read from the start label or the end label of the label block in the semi-structured data file.

In the operation 7, if the service attribute description information corresponding to the first data set includes a specified keyword, it is determined that the type of the first data is a metric type. If the service attribute description information corresponding to the first data set does not include a specified keyword, it is determined that the type of the first data is a coding type. Optionally, the specified keyword is a name of data used to measure an object, including a height, a weight, a length, and the like.

8. If the structure of the first data is a floating-point number structure, determine that the type of the first data is a metric type, and end the process.

9. If the structure of the first data is a text structure, obtain an occurrence frequency of the first data. If the occurrence frequency of the first data does not exceed Q, Q is a fourth threshold, and Q is an integer greater than 0, determine that the type of the first data is a description type. If the occurrence frequency of the first data exceeds Q, perform the operation 10.

Q=1, 2, 3, or the like.

If the occurrence frequency of the first data does not exceed Q, it indicates that the occurrence frequency of the first data is low. In addition, because the first data is the text structure, it is determined that the first data is description information for describing an object, that is, the type of the first data is the description type.

If the occurrence frequency of the first data exceeds Q, the occurrence frequency of the first data is high, and it indicates that the first data may be a flag type (yes or no, true or false), or it indicates that the first data may be a code type.

10. Determine whether a data range corresponding to the two-category data includes the first data, and if the data range includes the first data, determine that the type of the first data is a flag type, or if the data range does not include the first data, determine that the type of the first data is a code type.

The data range corresponding to the two-category data includes yes, no, true, false, correct, incorrect, and the like.

In some embodiments, after the type of the first data is obtained, the first data and the type of the first data form a training sample. A plurality of different training samples may be obtained based on a process of the foregoing operations 1 to 10, or a plurality of training samples may be manually set, and then the plurality of training samples are used to train an intelligent algorithm, to obtain a type identification model. In this way, when a type of data needs to be obtained, the data is input into the type identification model, such that the type identification model identifies the type of the data, and obtains the type of the data output by the type identification model.

4032: Obtain the at least one data feature of the first data set based on the type of the data in the first data set.

In 4032, each piece of data that belongs to the first type is obtained from the first data set, and the statistical feature of the data in the first data set is obtained based on each piece of data that belongs to the first type. The statistical feature includes a maximum value, a minimum value, an average value, a deviation, a variance, a median, a percentile, and/or a standard deviation in the data that belongs to the first type, the first type includes an integer, a floating-point number, a metric type, and/or a coding type, and the at least one data feature includes the statistical feature of data in the first data set.

And/or, each piece of data that belongs to the second type is obtained from the first data set, and the distribution feature of the data in the first data set is obtained based on each piece of data that belongs to a second type. The distribution feature includes an occurrence quantity and/or an occurrence frequency of each piece of data that belongs to the second type, the second type includes a flag type, a Boolean type, a category type, and/or a code type, and the at least one data feature includes the distribution feature of the data in the first data set.

In some embodiments, the first data set may include data of an English-digit hybrid structure. For ease of description, the data is referred to as second data, that is, a data structure of the second data is an English-digit hybrid structure. Each piece of data of the first type includes a digital part in the second data, and each piece of data of the second type includes an English part in the second data.

For example, assuming that the second data is "KH000001", each piece of data that belongs to the first type includes a digital part "000001" in the second data, and each piece of data that belongs to the second type includes an English part "KH" in the second data.

Third, the at least one data feature includes at least one segmented word, the at least one segmented word is obtained by performing segmentation on third data and removing a stop word, and the third data includes the service attribute description information corresponding to the first data set and/or data of a description type in the first data set.

In some embodiments, word segmentation is performed on the third data to obtain a plurality of segmented words, a stop word that belongs to a stop word table is removed from the plurality of segmented words, and a remaining segmented word is used as the data feature of the first data set.

For the stop word, word segmentation may be performed on data of a determined text type, occurrence frequency of each segmented word is counted, a segmented word whose occurrence frequency exceeds an occurrence frequency threshold is selected, and the stop word table is obtained based on the selected segmented word. Optionally, the selected segmented word is displayed, to enable a skilled person to filter out a non-stop word to form a stop word list suing remaining segmented words.

Fourth, the at least one data feature includes a statistical feature corresponding to a first language, and the statistical feature is used to reflect a statistical situation of data corresponding to the first language. Optionally, the statistical feature includes a data occurrence quantity and/or a data occurrence frequency corresponding to the first language, and a language to which the data of the description type in the first data set belongs includes the first language.

For any data of the description type in the first data set, the data includes an English letter, a Chinese character, a Japanese character, and/or the like. In other words, the data includes characters in one or more languages. For example, for the foregoing enumerated data "A global-leading ICT infrastructure and intelligent terminal provider", the data includes English letters and Chinese characters, and the data corresponds to two languages: English and Chinese. In other words, languages to which the data belongs includes English and Chinese.

One or more languages to which each piece of data of the description type belongs are identified from the first data set, to obtain a language to which the data of the description type in the first data set belongs. For any language, for ease of description, the language is referred to as the first language. Data corresponding to the first language is obtained from the first data set, a quantity of obtained data is counted, to obtain a data occurrence quantity corresponding to the first language, and/or a data occurrence frequency corresponding to the first language is calculated based on the counted quantity and a total quantity of data included in the first data set.

In conclusion, the at least one data feature of the first data set includes a statistical feature corresponding to a data pattern of the first data set (a data occurrence quantity and/or a data occurrence frequency corresponding to the data pattern), a distribution feature of data in the first data set, a statistical feature of data in the first data set, at least one segmented word, and/or a statistical feature corresponding to a language in the first data set (a data occurrence quantity and/or a data occurrence frequency corresponding to the language), and the like.

Step 404: Determine, based on the at least one data feature, a connected graph to which the first data set belongs, where nodes in the connected graph are different data sets, and a similarity between a neighboring node of the first data set and the first data set exceeds a specified threshold.

A similarity between any two adjacent nodes in the connected graph exceeds the specified threshold, and there is an edge between the two adjacent nodes.

In some embodiments, the connected graph to which the first data set belongs is determined based on the at least one data feature and the service type of the data in the first data set.

In step 404, the connected graph to which the first data set belongs is determined suing the following operations 4041 to 4044, where the operations 4041 to 4044 are as follows.

4041: Obtain at least one feature set of the first data set, where each feature set includes a data feature of a same feature type.

For example, the statistical feature of the data in the first data set, the statistical feature corresponding to the data pattern of the first data set, and/or the statistical feature corresponding to the language of the first data set form a feature set, the distribution feature of the data in the first data set form a feature set, and/or the at least one segmented word forms a feature set.

In some embodiments, the service type of the data in the first data set is further combined into a feature set. In this way, the connected graph to which the first data set belongs is determined based on the at least one data feature and the service type of the data in the first data set.

In some embodiments, each feature set is a feature vector or a feature matrix, and each feature set corresponds to a different feature type. For example, the statistical feature of the data in the first data set is used as content of the first row of the matrix, the statistical feature corresponding to the data pattern of the first data set is used as content of the second row of the matrix, and the statistical feature corresponding to the language of the first data set is used as content of the third row of the matrix. In this way, the obtained feature set is a three-row feature matrix. For another example, the distribution feature of the data in the first data set is combined into one feature vector, and/or the at least one segmented word is combined into one feature vector, and the two feature vectors are two different feature sets.

There may be at least one connected graph, or there may be no connected graph. When there is no connected graph, the first data set is directly used as a node in a connected graph, and then the first data set is re-performed from step 401, that is, another data set is obtained. The another data set is processed from step 401 to obtain at least one feature set of the another data set, and the another data set is used as a second data set. When there is at least one connected graph, nodes in each connected graph are data sets. For example, as shown in FIG. 5A and FIG. 5B, the management device already has three connected graphs: a connected graph 1, a connected graph 2, and a connected graph 3, and each node in the three connected graphs is a different data set. For a data set in any connected graph, for ease of description, the data set is referred to as the second data set, and before the second data set is added to the connected graph, at least one feature set of the second data set is obtained based on the operations in steps 401 to 404. The second data set is different from the first data set. The first data set and the second data set may be two different data sets in a same storage file, or may be data sets in two different storage files.

The second data set may have been associated with a data standard, or the second data set may not be associated with a data standard. That is, for any connected graph, any data set in the connected graph may be associated with a data standard, or may not be associated with a data standard.

4042: Obtain a similarity between the first data set and the second data set based on the at least one feature set of the first data set and the at least one feature set of the second data set.

In 4042, one feature set is selected from the at least one feature set of the first data set, one feature set is selected from the at least one feature set of the second data set, and the two selected feature sets are two feature sets of a same feature type. A similarity corresponding to the feature type is obtained based on the two feature sets suing a similarity algorithm corresponding to the feature type. A similarity corresponding to at least one feature type may be obtained in the foregoing manner, and the similarity between the first data set and the second data set is obtained based on a similarity corresponding to each feature type and a weight corresponding to each feature type.

As shown in FIG. 5A and FIG. 5B, for example, feature types corresponding to the two data sets are statistical features of data in the two data sets, and a used similarity algorithm includes a clustering algorithm such as Kmeans (a Euclidean distance algorithm) or Kmeans+. For another example, the feature types corresponding to the two data sets are distribution features of data in the two data sets, a distribution feature corresponding to a data pattern, and/or a distribution feature corresponding to a language, and a used similarity algorithm includes a feature similarity distance calculation algorithm such as a Mahalanobis distance or a Jaccard distance. For another example, feature types corresponding to the two data sets are segmented words and/or service types of data, and a used similarity algorithm includes a text similarity calculation algorithm such as distance editing or fuzzy matching.

In some embodiments, it is determined, based on a synonym table, whether there is a synonym in segmented words included in the service attribute description information corresponding to the first data set and segmented words included in the service attribute description information corresponding to the second data set. If there is a synonym, the similarity between the first data set and the second data set is increased based on a quantity of synonyms.

In some embodiments, it is determined, based on an antonym table, whether there is an antonym in segmented words included in the service attribute description information corresponding to the first data set and segmented words included in the service attribute description information corresponding to the second data set. If there is an antonym, the similarity between the first data set and the second data set is reduced based on a quantity of antonyms.

The synonym table and the antonym table are preset word tables.

The foregoing processes 4041 and 4042 are duplicated, and a similarity between the first data set and another data set in the at least one connected graph may be further obtained.

4043: Determine at least one target node in the at least one connected graph, where a similarity between the first data set and each target node exceeds a specified similarity threshold.

In 4043, at least one node whose similarity to the first data set exceeds the specified similarity threshold is selected in the at least one connected graph, where the at least one node is a target node.

4044: Connect a node corresponding to the first data set to each target node, and determine a connected graph in which the node corresponding to the first data set is located.

The node corresponding to the first data set is connected to each target node, such that the node corresponding to the first data set is added to a connected graph.

Figure 8:
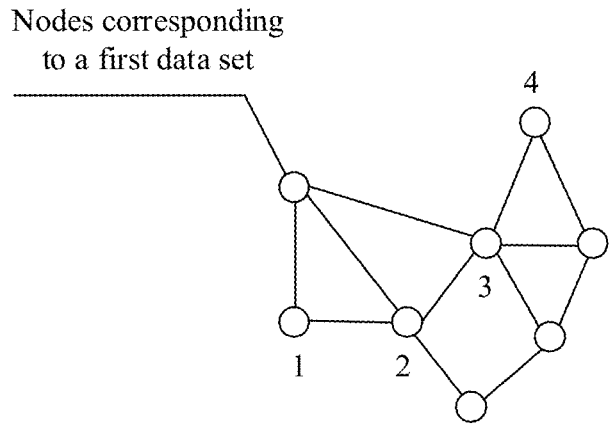
FIG. 8 is a connected graph according to an embodiment.

For example, as shown in FIG. 5A and FIG. 5B, it is assumed that at least one node whose similarity to the first data set exceeds the specified similarity threshold is selected from the connected graph 1, the connected graph 2, and the connected graph 3, the at least one node is three nodes in the connected graph 2, and the three nodes are a node 1, a node 2, and a node 3. As shown in FIG. 8, the node corresponding to the first data set is connected to the three nodes, such that the node corresponding to the first data set is added to the connected graph 2.

In some embodiments, a connected graph in which the node corresponding to the first data set is located and the at least one target node are displayed.

After the display, a skilled person may adjust a connection relationship between the node corresponding to the first data set and one or more target nodes in the connected graph. In this way, the first threshold, the second threshold, the third threshold, and/or the fourth threshold are adjusted based on a target node adjusted by the skilled person and the at least one target node before adjustment.

Figure 9:
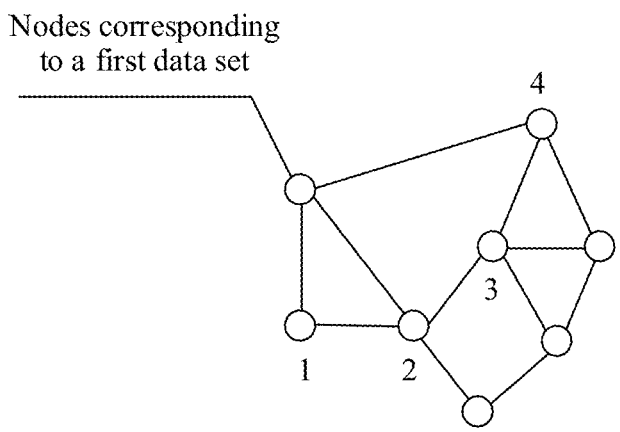
FIG. 9 is another connected graph according to an embodiment.

For example, the connected graph 2 shown in FIG. 8 is displayed. As shown in FIG. 9, a skilled person may cancel a connection relationship between the node corresponding to the first data set and the node 3, and connect the node corresponding to the first data set to the node 4. The management device adjusts the first threshold, the second threshold, the third threshold, and/or the fourth threshold based on the adjusted node 3 and node 4 and the node 1, the node 2, and the node 3 before adjustment.

Step 405: Obtain a first data standard based on a data set included in the connected graph, and associate the first data standard with the first data set.

In some embodiments, before the first data standard is associated with the first data set, the first data standard is further displayed. When a command triggered by a skilled person for confirming in associating the first data standard with the first data set is received, the first data standard is associated with the first data set.

For example, as shown in FIG. 6, the management device displays a data standard, that is, recommends a data standard whose standard number is DB0001 to a skilled person. A skilled person taps a confirmation button to trigger a command for confirming in associating the first data standard with the first data set. When receiving the command, the management device associates the data standard with the first data set (that is, associates the data standard of the DB0001 with a column in which the customer code is located). Optionally, a skilled person may also modify a displayed data standard, and then tap the confirmation button.

Each data set in the connected graph may not be associated with a data standard, or some data sets in the connected graph have been associated with a data standard.

When some data sets in the connected graph have been associated with a data standard, in step 405, the at least one data standard is obtained. The at least one data standard includes a data standard associated with another data set other than the first data set in the connected graph, and one data standard is selected as the first data standard from the at least one data standard based on an association frequency of each data standard in the at least one data standard.

In some embodiments, one or more data sets in the connected graph are associated with one data standard, and an association frequency of the data standard includes a quantity of data sets associated with the data standard. A data standard with a highest association frequency may be selected from the at least one data standard as the first data standard, and the first data standard is associated with the first data set.

Data sets in a same connected graph are similar, such that it can be learned that the at least one data standard is a duplicate data standard. To avoid data standard repetition, duplicate data may be deduplicated for the at least one data standard.

During implementation, a data standard associated with each data set other than the first data set in the connected graph is updated to the first data standard. In this way, each data set in the connected graph is associated with the first data standard, such that a duplicate and redundant data standard is removed.

Figure 10:
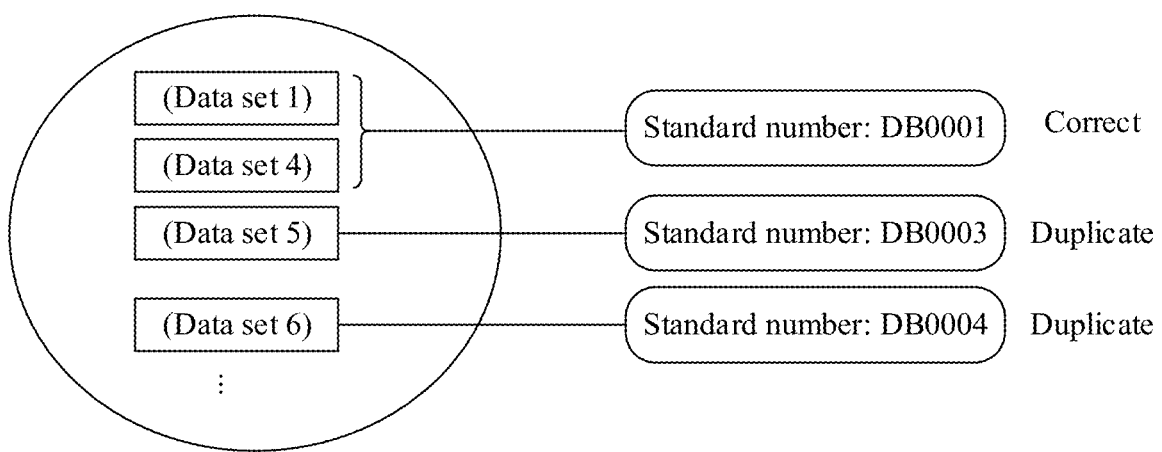
FIG. 10 is a schematic diagram of another display interface according to an embodiment.

As shown in FIG. 10, the management device may further display data sets in the connected graph and display numbers of data standards associated with the data sets in the connected graph. For the first data standard with the highest association frequency, the management device distinguishes and displays the first data standard from other data standards suing a mark, such that a skilled person knows which data standard is the first data standard and which data standard is a data standard that a duplicate of the first data standard.

In some embodiments, for a data set that is not associated with a data standard in the connected graph, the data set is also associated with the first data standard.

In some embodiments, when each data set in the connected graph is not associated with a data standard, in step 405, the first data standard is generated based on at least one data pattern and/or at least one data feature of each data set in the connected graph, and each data set in the connected graph is associated with the first data standard.

As shown in FIG. 5A and FIG. 5B, during implementation, first standard content is generated based on a distribution feature of data in each data set in the connected graph; second standard content is generated based on at least one data pattern of each data set in the connected graph; and/or third standard content is generated based on a distribution feature and/or a statistical feature of data in each data set in the connected graph, so as to obtain the first data standard.

In some embodiments, for the first standard content, a first frequency average is calculated based on an occurrence frequency corresponding to a null in each data set. When the first frequency average exceeds a first frequency threshold, it is determined that the first standard content indicates that a null is allowed to be entered into the first data set, or when the first frequency average does not exceed the first frequency threshold, it is determined that the first standard content indicates that a null is not allowed to be entered into the first data set.

In some embodiments, the at least one data pattern of the first data set includes a basic data pattern corresponding to each piece of data in the first data set and/or one or more prefix data patterns corresponding to the first data set. In this way, for a basic data pattern of any piece of data, a data occurrence frequency average value corresponding to the basic data pattern is calculated based on a data occurrence frequency corresponding to a basic data pattern of each data set, so as to obtain a data occurrence frequency average value corresponding to at least one basic data pattern. For any one prefix data pattern, a data occurrence frequency average value corresponding to the prefix data pattern is calculated based on a data occurrence frequency corresponding to a prefix data pattern of each data set, so as to obtain a data occurrence frequency average value corresponding to at least one prefix data pattern. A basic data pattern in which a data occurrence frequency average value exceeds a second frequency threshold is selected as a general pattern in the second standard content, and a prefix data pattern in which a data occurrence frequency average value exceeds a third frequency threshold is selected as a prefix data pattern in the second standard content.

In some embodiments, a data type is determined based on a basic structure indicated by the selected basic data pattern, and the first data standard further includes the data type. For example, when the basic structure indicated by the basic data pattern is an English-digit hybrid structure or a text structure, the determined data type is a character type. For another example, when the basic structure indicated by the basic data pattern is an integer structure, the determined data type is an integer. For another example, when the basic structure indicated by the basic data pattern is a floating-point number structure, the determined data type is a floating-point type.

In some embodiments, a data length is determined based on the general pattern (the selected basic data pattern) in the second standard content, and the first standard content further includes the data length. For example, if the selected basic data pattern is {English uppercase}[2 digits]{digit}[6 digits], the determined data length is 8 digits.

For the third standard content, a maximum value is selected from maximum values of data in each data set as an upper limit value of a value range, and a minimum value is selected from minimum values of the data in each data set as a lower limit value of the value range, so as to obtain the value range in the third standard content.

The first standard content, the second standard content, and the third standard content may further include other content, and the other content may be obtained based on content such as a data pattern and a data feature of each data set in the connected graph.

In some embodiments, for a standard name of the first data standard, service attribute description information corresponding to each data set in the connected graph includes a plurality of segmented words. For each segmented word, an average occurrence frequency of the segmented word is calculated based on an occurrence frequency of a segmented word corresponding to each data set. One or more segmented words with a maximum average occurrence frequency are selected, from the plurality of segmented words, as the standard name of the first data standard.

In some embodiments, the data set in the connected graph includes floating-point numbers, a length of a decimal place of each floating-point number is counted, a longest decimal place length is selected from the counted length of the decimal place, and the longest decimal place length is used as data precision included in the first data standard. For example, it is assumed that a maximum length of decimal places is 2, which indicates that a length of decimal places of data allowed to be stored in the first data set cannot exceed two. If the data sets in the connected graph do not include a floating-point number, the data precision included in the first data standard is none.

In step 401, the management device obtains the storage file from the server. Optionally, after the management device obtains the first data standard, the management device sends association information to the server. The association information includes a file identifier of the storage file, a set identifier of the first data set, and the first data standard. The server receives the association information, associates the first data standard with the first data set in the storage file based on the association information, and then regulates, suing the first data standard, normativity of to-be-stored data in the first data set included in the storage file.

For example, the management device obtains, from the data lake, the database table shown in Table 1. The management device uses the first column of data (the first column of data is the customer code) in the database table as the first data set. After associating the first data set with the first data standard, the management device sends association information to the data lake. The association information includes a file identifier (for example, may be a file name and/or a storage path of the storage file) of the storage file, the set identifier (for example, may be a column name and/or a column number of the column of data) of the first data set and the first data standard. The data lake receives the association information, and associates the first column of data in the database table shown in Table 1 with the first data standard based on the association information.

When a data source receives a piece of customer code that needs to be stored in the database table shown in Table 1, the data lake detects, suing the first data standard, whether the customer code meets the normativity regulated by the first data standard. If the customer code meets the normativity regulated by the first data standard, the data lake stores the customer code in the first column of the database table shown in Table 1. If the customer code does not meet the normativity regulated by the first data standard, the data lake discards the customer code or prompts the user to modify the customer code.

In some embodiments, after the first data set is associated with the first data standard, the server detects each piece of data in the first data set based on the first data standard. If data that does not meet the normativity indicated by the first data standard is detected, the detected data is cleared or the detected data is converted, and converted data meets the normativity indicated by the first data standard.

The at least one data pattern of the first data set is obtained, and the at least one data feature of the first data set is obtained based on the at least one data pattern. The at least one data feature includes content such as a distribution feature and/or a statistical feature of data in the first data set and a distribution feature corresponding to a data pattern of the first data set. Therefore, the content of the at least one data feature is enriched. In this way, the connected graph in which the first data set is located can be automatically determined suing the at least one data feature. Because data sets in the connected graph are similar, a data set in the connected graph is associated with a data standard, and at least one data standard associated with the data set in the connected graph is obtained. The at least one data standard is a similar data standard. A data standard is selected as the first data standard based on an association frequency of each data standard, to improve precision of obtaining the first data standard, and each data set in the connected graph is associated with the first data standard, to remove a duplicate data standard. In the connected graph, a data set is associated with a data standard. Because data sets in the connected graph are similar, the first data standard is automatically generated based on a data pattern and a data feature of each data set in the connected graph, thereby improving precision and efficiency of generating the first data standard.

Figure 11:
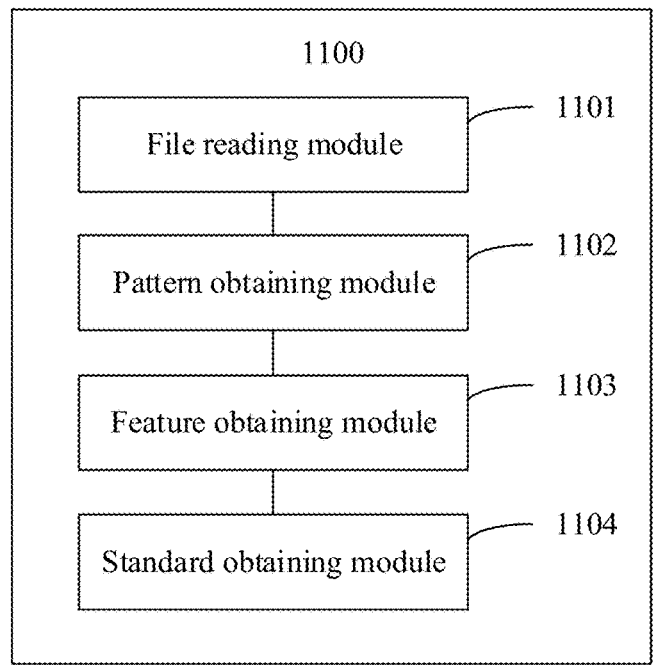
FIG. 11 is a schematic diagram of a structure of a data governance apparatus according to an embodiment.

As shown in FIG. 11, an embodiment provides a data governance apparatus 1100. The apparatus 1100 may be deployed on the management device in any one of the foregoing embodiments. For example, the apparatus 1100 is deployed on the management device 101 in the network architecture 100 shown in FIG. 1 or FIG. 2, or is deployed on the management device in the method 400 shown in FIG. 4. The apparatus 1100 includes: a file reading module 1101 configured to read a storage file from a database server, where the storage file is used to store data that belongs to at least one service; a pattern obtaining module 1102 configured to obtain at least one data pattern of a first data set, where the first data set includes data that belongs to a same service and that is stored in the storage file, and the at least one data pattern indicates a structure of each piece of data included in the first data set; a feature obtaining module 1103 configured to obtain at least one data feature of the first data set based on the at least one data pattern; and a standard obtaining module 1104, further configured to obtain a first data standard based on the at least one data feature, where the first data standard is used to regulate normativity of each piece of data included in the first data set.

Optionally, for a detailed implementation process in which the file reading module 1101 reads the storage file, refer to related content in step 401 of the method 400 shown in FIG. 4. Details are not described herein again.

Optionally, for a detailed implementation process in which the pattern obtaining module 1102 obtains the at least one data pattern, refer to related content in step 402 of the method 400 shown in FIG. 4. Details are not described herein again.

Optionally, for a detailed implementation process in which the feature obtaining module 1103 obtains the at least one data feature, refer to related content in step 403 of the method 400 shown in FIG. 4. Details are not described herein again.

Optionally, for a detailed implementation process in which the standard obtaining module 1104 obtains the first data standard, refer to related content in steps 404 and 405 in the method 400 shown in FIG. 4. Details are not described herein again.

Optionally, the storage file is a structured data file, the structured data file stores, in a list form, the data that belongs to the at least one service, and the data that belongs to the same service is stored in a same column of the structured data file.

Optionally, the storage file is a semi-structured data file, the semi-structured data file stores, in a label block form, the data that belongs to the at least one service, and the data that belongs to the same service is stored in a same label block of the semi-structured data file.

Optionally, the at least one data pattern includes a basic data pattern, the basic data pattern indicates a basic structure of each piece of data included in the first data set, and the basic structure includes one or more of the following: an English-digit hybrid structure, an integer structure, a floating-point number structure, a Boolean structure, an address structure, an identifier structure, or a date structure.

Optionally, the pattern obtaining module 1102 is configured to identify each piece of data in the first data set based on at least one specified regular expression, to obtain the basic data pattern.

Optionally, for a detailed implementation process in which the pattern obtaining module 1102 obtains the basic data pattern, refer to related content in step 402 of the method 400 shown in FIG. 4. Details are not described herein again.

Optionally, the at least one data pattern further includes a prefix data pattern, the prefix data pattern indicates a plurality of pieces of data that are in the first data set and that include a first prefix, the first prefix is a longest common prefix of the plurality of pieces of data, and parts other than the first prefix in each of the plurality of pieces of data are corresponding to a same basic data pattern.

Optionally, the feature obtaining module 1103 is configured to: obtain, from the first data set, each piece of data corresponding to a first data pattern, where the at least one data pattern includes the first data pattern; and obtain, based on each piece of obtained data, a data occurrence quantity and/or a data occurrence frequency corresponding to the first data pattern, where the at least one data feature includes the data occurrence quantity and/or the data occurrence frequency corresponding to the first data pattern.

Optionally, for a detailed implementation process in which the feature obtaining module 1103 obtains the data occurrence quantity and/or the data occurrence frequency corresponding to the first data pattern, refer to related content in step 403 of the method 400 shown in FIG. 4. Details are not described herein again.

Optionally, the feature obtaining module 1103 is configured to: obtain a type of the data in the first data set based on the at least one data pattern; and obtain the at least one data feature of the first data set based on the type of the data in the first data set.

Optionally, for a detailed implementation process in which the feature obtaining module 1103 obtains the type of the data in the first data set, refer to related content in step 4031 in the method 400 shown in FIG. 4. Details are not described herein again.

Optionally, for a detailed implementation process in which the feature obtaining module 1103 obtains the at least one data feature, refer to related content in step 4032 in the method 400 shown in FIG. 4. Details are not described herein again.

Optionally, the first data set includes first data, and a type of the first data includes one or more of the following: a basic type or a technology type of the first data, the basic type is used to describe a data component of the first data, and the technology type is used to describe a function implemented by the first data.

Optionally, the basic type of the first data is an integer, a floating-point number, or a Boolean type, and the technology type of the first data is a code type, a coding type, a flag type, a category type, a description type, or a metric type.

Optionally, the feature obtaining module 1103 is configured to: obtain a statistical feature based on each piece of data that belongs to a first type and that is included in the first data set, where the statistical feature includes a maximum value, a minimum value, an average value, a deviation, a variance, a median, a percentile, and/or a standard deviation of each piece of data that belongs to the first type, the first type includes an integer, a floating-point number, a metric type, and/or a coding type, and the at least one data feature includes the statistical feature; and/or obtain a distribution feature based on each piece of data that belongs to a second type and that is included in the first data set, where the distribution feature includes an occurrence quantity and/or an occurrence frequency of each piece of data that belongs to the second type, the second type includes a flag type, a Boolean type, a category type, and/or a code type, and the at least one data feature includes the distribution feature.

Optionally, for a detailed implementation process in which the feature obtaining module 1103 obtains the statistical feature, refer to related content in step 4032 of the method 400 shown in FIG. 4. Details are not described herein again.

Optionally, for a detailed implementation process in which the feature obtaining module 1103 obtains the distribution feature, refer to related content in step 4032 in the method 400 shown in FIG. 4. Details are not described herein again.

Optionally, the first data set includes second data, a data structure of the second data is an English-digit hybrid structure, each piece of data that belongs to the first type includes a digital part in the second data, and each piece of data that belongs to the second type includes an English part in the second data.

Optionally, the data feature of the first data set includes at least one segmented word, the at least one segmented word is obtained by performing segmentation on third data and removing a stop word, and the third data includes service attribute description information corresponding to the first data set and/or data of a description type in the first data set.

Optionally, the data feature of the first data set includes a data occurrence quantity and/or a data occurrence frequency corresponding to a first language, and a language to which the data of the description type in the first data set belongs includes the first language.

Optionally, the standard obtaining module 1104 is configured to: determine, based on the at least one data feature, a connected graph to which the first data set belongs, where nodes in the connected graph are different data sets, and a similarity between a neighboring node of the first data set and the first data set exceeds a specified threshold; and obtain the first data standard based on a data set included in the connected graph.

Optionally, for a detailed implementation process in which the standard obtaining module 1104 determines the connected graph, refer to related content in step 404 of the method 400 shown in FIG. 4. Details are not described herein again.

Optionally, for a detailed implementation process in which the standard obtaining module 1104 obtains the first data standard, refer to related content in step 405 of the method 400 shown in FIG. 4. Details are not described herein again.

Optionally, the standard obtaining module 1104 is configured to determine, based on the at least one data feature and a service type of the data in the first data set, the connected graph to which the first data set belongs, where the service type of the data is a date, a region, an address, or an identifier.

Optionally, the standard obtaining module 1104 is configured to: obtain at least one data standard, where the at least one data standard includes a data standard associated with another data set other than the first data set in the connected graph; and select one data standard as the first data standard from the at least one data standard based on an association frequency of each data standard in the at least one data standard.

Optionally, for a detailed implementation process in which the standard obtaining module 1104 obtains the at least one data standard and selects the first data standard from the at least one data standard, refer to related content in step 405 of the method 400 shown in FIG. 4. Details are not described herein again.

Optionally, the standard obtaining module 1104 is configured to update the data standard associated with the another data set to the first data standard.

Optionally, the standard obtaining module 1104 is configured to generate the first data standard based on at least one data pattern and/or at least one data feature of each data set in the connected graph.

Optionally, for a detailed implementation process in which the standard obtaining module 1104 generates the first data standard, refer to related content in step 405 of the method 400 shown in FIG. 4. Details are not described herein again.

Optionally, the normativity includes data integrity, data consistency, and/or data accuracy, the first data standard includes first standard content, second standard content, and/or third standard content, the first standard content is used to regulate data integrity of the first data set, the second standard content is used to regulate data consistency of the first data set, and the third standard content is used to regulate data accuracy of the first data set.

Optionally, the standard obtaining module 1104 is configured to: generate the first standard content based on a distribution feature of data in each data set; and/or generate the second standard content based on the at least one data pattern of each data set; and/or generate the third standard content based on a distribution feature and/or a statistical feature of data in each data set.

In this embodiment, the pattern obtaining module obtains the at least one data pattern of the first data set, the first data set includes the data that belongs to the same service, and the at least one data pattern indicates a structure of each piece of data included in the first data set. The standard obtaining module obtains the first data standard based on the at least one data pattern, and the first data standard is used to regulate normativity of data included in the first data set. In this way, the pattern obtaining module obtains the at least one data pattern of the first data set, and the standard obtaining module automatically obtains, based on the at least one data pattern, the first data standard associated with the first data set, thereby improving efficiency and precision of obtaining the data standard.

Figure 12:
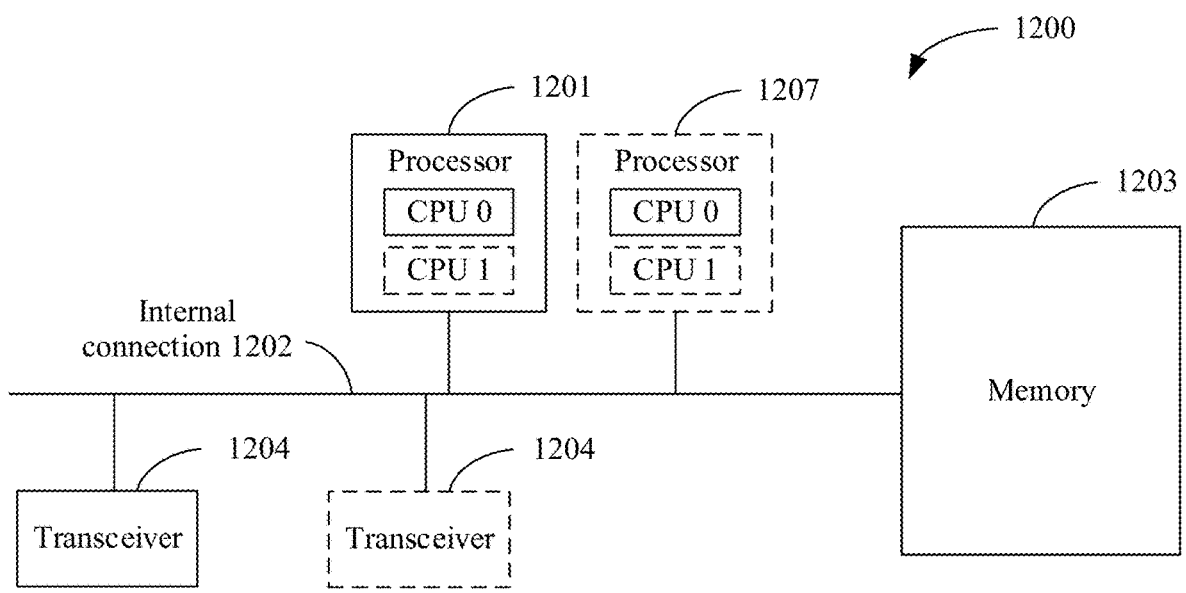
FIG. 12 is a schematic diagram of a structure of another computer device according to an embodiment.

As shown in FIG. 12, an embodiment provides a schematic diagram of a computer device 1200. The computer device 1200 may be the management device in the foregoing embodiments. For example, the apparatus 1200 may be the management device 101 in the network architecture 100 shown in FIG. 1 or FIG. 2, or may be the management device in the method 400 shown in FIG. 4. The apparatus 1200 includes at least one processor 1201, an internal connection 1202, a memory 1203, and at least one transceiver 1204.

The apparatus 1200 is an apparatus of a hardware structure, and may be configured to implement functional modules in the apparatus 1100 shown in FIG. 11. For example, a person skilled in the art may figure out the file reading module 1101 in the apparatus 1100 shown in FIG. 11. The file reading module 1101 in the apparatus 1100 shown in FIG. 11 may be implemented suing the at least one transceiver 1204. The pattern obtaining module 1102, the feature obtaining module 1103, and the standard obtaining module 1104 may be implemented by invoking code in the memory 1203 suing the at least one processor 1201.

Optionally, the apparatus 1200 may be further configured to implement the functions of the management device in any of the foregoing embodiments.

Optionally, the processor 1201 may be a general-purpose central processing unit (CPU), a network processor (NP), a microprocessor, an application-specific integrated circuit (ASIC), or one or more integrated circuits configured to control program execution of the solutions.

The internal connection 1202 may include a path for transmitting information between the foregoing components. Optionally, the internal connection 1202 is a board, a bus, or the like.

The transceiver 1204 is configured to communicate with another device or a communication network.

The memory 1203 may be a read-only memory (ROM) or another type of static storage device that can store static information and instructions, or a random-access memory (RAM) or another type of dynamic storage device that can store information and instructions, or may be an electrically erasable programmable ROM (EEPROM), a compact disc ROM (CD-ROM), or another optical disk storage, an optical disc storage (including a compact disc, a laser disc, an optical disc, a digital versatile disc, a Blu-ray disc, or the like), a disk storage medium or another magnetic storage device, or any other medium that can be used to carry or store expected program code in a form of instructions or a data structure and that can be accessed by a computer. However, the memory 1203 is not limited thereto. The memory may exist independently and is connected to the processor through the bus. Alternatively, the memory may be integrated with the processor.

The memory 1203 is configured to store application program code for performing solutions, and the processor 1201 controls execution of the application program code. The processor 1201 is configured to execute the application program code stored in the memory 1203, and cooperate with the at least one transceiver 1204, such that the apparatus 1200 implements functions in the method in this patent.

During implementation, in an embodiment, the processor 1201 may include one or more CPUs such as a CPU 0 and a CPU 1 in FIG. 12.

During implementation, in an embodiment, the apparatus 1200 may include a plurality of processors, such as the processor 1201 and a processor 1207 in FIG. 12. Each of these processors may be a single-core (single-CPU) processor or a multi-core (multi-CPU) processor. The processor herein may be one or more devices, circuits, and/or processing cores configured to process data (for example, computer program instructions).

A person of ordinary skill in the art may understand that all or some of the steps of embodiments may be implemented by hardware or a program instructing related hardware. The program may be stored in a computer-readable storage medium. The storage medium may be a read-only memory, a magnetic disk, an optical disc, or the like.

The foregoing descriptions are only optional embodiments, but are not intended to limit this disclosure. Any modification, equivalent replacement, or improvement made within the principle of this disclosure should fall within the protection scope of this disclosure.

What is claimed is:

1. A method comprising:
   reading a storage file from a database server, wherein the storage file stores data that belong to at least one service, wherein the data comprise a first data set, and wherein the first data set comprises first data that belong to a first service of the at least one service;
   obtaining at least one data pattern of the first data set, wherein the at least one data pattern indicates a structure of the first data;
   obtaining at least one data feature of the first data set based on the at least one data pattern, wherein the at least one data feature comprises a statistical feature or a distribution feature;
   generating, based on the at least one data feature, a first data standard regulating normativity of each piece of the first data;
   receiving association information associating the first data standard with the first data set in the storage file, wherein the association information comprises a file identifier of the storage file, a set identifier of the first data set, and the first data standard; and regulating, using the first data standard, normativity of to-be-stored data in the first data set.

2. The method of claim 1, wherein the storage file is a structured data file storing the data in a list form and the first data are stored in a same column of the structured data file, or wherein the storage file is a semi-structured data file storing the data in a label block form, and the first data are stored in a same label block of the semi-structured data file.

3. The method of claim 1, wherein the at least one data pattern comprises a basic data pattern indicating a basic structure of each piece of the first data, and wherein the basic structure comprises an English-digit hybrid structure, an integer structure, a floating-point number structure, a Boolean structure, an address structure, an identifier structure, or a date structure.

4. The method of claim 3, wherein obtaining the at least one data pattern comprises identifying each piece of the first data based on a specified regular expression to obtain the basic data pattern.

5. The method of claim 3, wherein the at least one data pattern further comprises a prefix data pattern indicating pieces of the first data comprising a prefix that is a longest common prefix of the plurality of the pieces.

6. The method of claim 1, wherein obtaining the at least one data feature comprises:
obtaining, from the first data, second data corresponding to a first data pattern of the at least one data pattern; and
obtaining, based on the second data, a data occurrence quantity or a data occurrence frequency corresponding to the first data pattern, wherein the at least one data feature comprises the data occurrence quantity or the data occurrence frequency.

7. The method of claim 1, wherein obtaining the at least one data feature comprises:
obtaining a type of the first data based on the at least one data pattern; and
obtaining the at least one data feature based on the type.

8. The method of claim 7, wherein the type comprises a basic type or a technology type, wherein the basic type describes a data component of the first data, and wherein the technology type describes a function implemented by the first data.

9. The method of claim 8, wherein the basic type is an integer type, a floating-point number type, or a Boolean type, and wherein the technology type is a code type, a coding type, a flag type, a category type, a description type, or a metric type.

10. The method of claim 1, wherein obtaining the at least one data feature comprises:
obtaining a statistical feature based on each piece of the first data that belongs to a first type, wherein the statistical feature comprises a maximum value, a minimum value, an average value, a deviation, a variance, a median, a percentile, or a standard deviation of each piece of the first data, wherein the first type comprises an integer, a floating-point number, a metric type or a coding type, and wherein the at least one data feature comprises the statistical feature; or
obtaining a distribution feature based on each piece of the first data that belongs to a second type, wherein the distribution feature comprises an occurrence quantity or an occurrence frequency of each piece of the first data, wherein the second type comprises a flag type, a Boolean type, a category type, or a code type, and wherein the at least one data feature comprises the distribution feature.

11. The method of claim 1, wherein the at least one data feature comprises a segmented word, wherein the method further comprises further obtaining the at least one data feature by obtaining the segmented word by performing segmentation on second data and removing a stop word from the second data, and wherein the second data comprise service attribute description information corresponding to the first data set or third data of a description type in the first data set.

12. The method of claim 11, wherein the at least one data feature comprises a data occurrence quantity or a data occurrence frequency corresponding to a language, and wherein the third data belong to the language.

13. The method of claim 1, wherein obtaining the first data standard comprises:
determining, based on the at least one data feature, a connected graph to which the first data set belongs, wherein nodes in the connected graph are different data sets of the data, and wherein a similarity between a neighboring node of the first data set and a node of the first data set exceeds a specified threshold; and
obtaining the first data standard based on a data set in the connected graph.

14. The method of claim 13, further comprising further determining the connected graph based on a service type of the first data, wherein the service type is a date, a region, an address, or an identifier.

15. The method of claim 13, wherein obtaining the first data standard comprises:
obtaining at least one data standard comprising a data standard associated with another data set other than the first data set; and
selecting the first data standard from the at least one data standard based on an association frequency of each data standard in the at least one data standard.

16. An apparatus comprising:
a memory configured to store an instruction; and
one or more processors configured to execute the instruction to cause the apparatus to:
read a storage file from a database server, wherein the storage file stores data that belong to at least one service, wherein the data comprise a first data set, and wherein the first data set comprises first data that belong to a first service of the at least one service;
obtain at least one data pattern of the first data set, wherein the at least one data pattern indicates a structure of the first data;
obtain at least one data feature of the first data set based on the at least one data pattern, wherein the at least one data feature comprises a statistical feature or a distribution feature;
generate, based on the at least one data feature, a first data standard regulating normativity of each piece of the first data;
receive association information associating the first data standard with the first data set in the storage file, wherein the association information comprises a file identifier of the storage file, a set identifier of the first data set, and the first data standard; and
regulate, using the first data standard, normativity of to-be-stored data in the first data set.

17. The apparatus of claim 16, wherein the storage file is a structured data file storing the data in a list form and the first data are stored in a same column of the structured data file, or wherein the storage file is a semi-structured data file storing the data in a label block form and the first data are stored in a same label block of the semi-structured data file.

18. The apparatus of claim 16, wherein the at least one data pattern comprises a basic data pattern indicating a basic structure of each piece of the first data, and wherein the basic structure comprises an English-digit hybrid structure, an integer structure, a floating-point number structure, a Boolean structure, an address structure, an identifier structure, or a date structure.

19. The apparatus of claim 16, wherein the one or more processors are further configured to execute the instruction to cause the apparatus to obtain the at least one data feature by:
  obtaining, from the first data, second data corresponding to a first data pattern of the at least one data pattern; and
  obtaining, based on the second data, a data occurrence quantity or a data occurrence frequency corresponding to the first data pattern, wherein the at least one data feature comprises the data occurrence quantity or the data occurrence frequency.

20. The apparatus of claim 16, wherein the one or more processors are further configured to execute the instruction to cause the apparatus to obtain the first data standard by:
  determining, based on the at least one data feature, a connected graph to which the first data set belongs, wherein nodes in the connected graph are different data sets of the data, and wherein a similarity between a neighboring node of the first data set and a node of the first data set exceeds a specified threshold; and
  obtaining the first data standard based on a data set in the connected graph.

* * * * *